(12) United States Patent
Dojan et al.

(10) Patent No.: US 8,388,791 B2
(45) Date of Patent: Mar. 5, 2013

(54) METHOD FOR MOLDING TENSILE STRAND ELEMENTS

(75) Inventors: Frederick J. Dojan, Vancouver, WA (US); James Hwang, Taichung (TW)

(73) Assignee: NIKE, Inc., Beaverton, OR (US)

( * ) Notice: Subject to any disclaimer, the term of this patent is extended or adjusted under 35 U.S.C. 154(b) by 851 days.

(21) Appl. No.: 12/419,985

(22) Filed: Apr. 7, 2009

(65) Prior Publication Data

US 2010/0251491 A1    Oct. 7, 2010

(51) Int. Cl.
*A43D 11/00* (2006.01)
*B29C 70/84* (2006.01)

(52) U.S. Cl. ..... 156/242; 156/166; 12/142 R; 12/133 M

(58) Field of Classification Search .......... 156/242
See application file for complete search history.

(56) References Cited

U.S. PATENT DOCUMENTS

| | | | |
|---|---|---|---|
| 2,034,091 A | 3/1936 | Dunbar | |
| 2,048,294 A | 7/1936 | Roberts | |
| 2,205,356 A | 6/1940 | Gruensfelder | |
| 2,311,996 A | 2/1943 | Parker | |
| 3,439,434 A | 4/1969 | Tangorra | |
| 3,672,078 A | 6/1972 | Fukuoka | |
| 3,823,493 A | 7/1974 | Brehm et al. | |
| 4,154,888 A * | 5/1979 | Dewey | 428/215 |
| 4,271,116 A * | 6/1981 | Jones | 264/221 |
| 4,627,369 A | 12/1986 | Conrad et al. | |
| 4,634,616 A | 1/1987 | Musante | |
| 4,642,819 A | 2/1987 | Ales et al. | |
| 4,756,098 A | 7/1988 | Boggia | |
| 4,858,339 A | 8/1989 | Hayafuchi et al. | |
| 4,873,725 A | 10/1989 | Mitchell | |
| 5,149,388 A | 9/1992 | Stahl | |
| 5,156,022 A | 10/1992 | Altman | |
| 5,271,130 A | 12/1993 | Batra | |
| 5,285,658 A | 2/1994 | Altman et al. | |
| 5,345,638 A | 9/1994 | Nishida | |
| 5,359,790 A | 11/1994 | Iverson et al. | |
| 5,367,795 A | 11/1994 | Iverson et al. | |
| 5,380,480 A * | 1/1995 | Okine et al. | 264/316 |
| 5,399,410 A | 3/1995 | Urase | |

(Continued)

FOREIGN PATENT DOCUMENTS

| CN | 101125044 A | 2/2008 |
|---|---|---|
| DE | 20215559 | 1/2003 |

(Continued)

OTHER PUBLICATIONS

Office Action mailed Dec. 8, 2008 for U.S. Appl. No. 11/442,669.

(Continued)

*Primary Examiner* — Philip Tucker
*Assistant Examiner* — Vicki Wu
(74) *Attorney, Agent, or Firm* — Plumsea Law Group, LLC

(57) ABSTRACT

Articles of footwear and a variety of other products may incorporate tensile strand elements. In manufacturing an element, such as the tensile strand elements, a strand, a first layer, and a second layer may be located between a first surface and a second surface of a press. The first surface includes a first material and the second surface includes a second material, with the first material having greater hardness than the second material. The strand, the first layer, and the second layer are then compressed between the first surface and the second surface.

26 Claims, 27 Drawing Sheets

U.S. PATENT DOCUMENTS

| | | | |
|---|---|---|---|
| 5,645,935 A | 7/1997 | Kemper et al. | |
| 5,832,540 A | 11/1998 | Knight | |
| D405,587 S | 2/1999 | Merikoski | |
| 5,930,918 A | 8/1999 | Healy | |
| 5,990,378 A | 11/1999 | Ellis | |
| 6,003,247 A | 12/1999 | Steffe | |
| 6,004,891 A | 12/1999 | Tuppin et al. | |
| 6,009,637 A | 1/2000 | Pavone | |
| 6,029,376 A | 2/2000 | Cass | |
| 6,038,702 A | 3/2000 | Knerr | |
| 6,128,835 A | 10/2000 | Ritter | |
| 6,151,804 A | 11/2000 | Hieblinger | |
| 6,164,228 A | 12/2000 | Lin | |
| 6,170,175 B1 | 1/2001 | Funk | |
| 6,213,634 B1 | 4/2001 | Harrington et al. | |
| 6,416,499 B2 * | 7/2002 | Paul, Jr. | 604/256 |
| 6,440,245 B1 * | 8/2002 | Culzoni et al. | 156/94 |
| 6,615,427 B1 | 9/2003 | Hailey | |
| 6,665,958 B2 | 12/2003 | Goodwin | |
| 6,718,895 B1 | 4/2004 | Fortuna | |
| 6,860,214 B1 | 3/2005 | Wang | |
| 6,910,288 B2 | 6/2005 | Dua | |
| 7,086,179 B2 | 8/2006 | Dojan | |
| 7,086,180 B2 | 8/2006 | Dojan | |
| 7,100,310 B2 | 9/2006 | Foxen | |
| 7,293,371 B2 | 11/2007 | Aveni | |
| 7,337,560 B2 | 3/2008 | Marvin et al. | |
| 7,546,698 B2 | 6/2009 | Meschter | |
| 7,574,818 B2 | 8/2009 | Meschter | |
| 7,665,230 B2 | 2/2010 | Dojan | |
| 7,676,956 B2 | 3/2010 | Dojan | |
| 7,849,518 B2 | 12/2010 | Moore et al. | |
| 7,870,681 B2 | 1/2011 | Meschter | |
| 7,870,682 B2 | 1/2011 | Meschter et al. | |
| 2001/0051484 A1 | 12/2001 | Ishida et al. | |
| 2002/0031568 A1 * | 3/2002 | Matsumoto et al. | 425/193 |
| 2003/0178738 A1 | 9/2003 | Staub et al. | |
| 2004/0074589 A1 | 4/2004 | Gessler et al. | |
| 2004/0118018 A1 | 6/2004 | Dua | |
| 2004/0142631 A1 | 7/2004 | Luk | |
| 2004/0181972 A1 | 9/2004 | Csorba | |
| 2004/0261295 A1 | 12/2004 | Meschter | |
| 2005/0028403 A1 | 2/2005 | Swigart | |
| 2005/0115284 A1 | 6/2005 | Dua | |
| 2005/0132609 A1 | 6/2005 | Dojan | |
| 2005/0268497 A1 | 12/2005 | Alfaro | |
| 2006/0048413 A1 | 3/2006 | Sokolowski | |
| 2006/0137221 A1 | 6/2006 | Dojan | |
| 2007/0199210 A1 | 8/2007 | Vattes et al. | |
| 2007/0271821 A1 | 11/2007 | Meschter | |
| 2008/0110049 A1 | 5/2008 | Sokolowski et al. | |
| 2010/0018075 A1 | 1/2010 | Meschter et al. | |
| 2010/0037483 A1 | 2/2010 | Meschter et al. | |
| 2010/0043253 A1 * | 2/2010 | Dojan et al. | 36/47 |
| 2010/0154256 A1 | 6/2010 | Dua | |
| 2010/0175276 A1 | 7/2010 | Dojan et al. | |
| 2010/0251491 A1 | 10/2010 | Dojan et al. | |
| 2010/0251564 A1 | 10/2010 | Meschter | |
| 2011/0041359 A1 | 2/2011 | Dojan et al. | |

FOREIGN PATENT DOCUMENTS

| | | | |
|---|---|---|---|
| EP | 0082824 | | 6/1983 |
| EP | 0818289 | A2 | 1/1998 |
| FR | 1462349 | A | 10/1965 |
| FR | 1462349 | A | 2/1967 |
| FR | 2046671 | | 3/1971 |
| FR | 2457651 | A1 | 12/1980 |
| FR | 2823078 | A1 * | 10/2002 |
| GB | 2093862 | A * | 9/1982 |
| WO | 98/43506 | A | 10/1998 |
| WO | 9843506 | | 10/1998 |
| WO | 9843506 | A1 | 10/1998 |
| WO | WO 9843506 | A1 * | 10/1998 |
| WO | 03/013301 | A1 | 2/2003 |
| WO | 03013301 | A1 | 2/2003 |
| WO | WO 2004/089609 | | 10/2004 |
| WO | WO2007139567 | | 12/2007 |
| WO | WO2007140055 | | 12/2007 |

OTHER PUBLICATIONS

Office Action mailed Dec. 8, 2008 for U.S. Appl. No. 11/442,679.
Notice of Allowance mailed Feb. 10, 2009 for U.S. Appl. No. 11/442,679.
International Search Report and Written Opinion for PCT/US2007/066696, mailed Sep. 7, 2007.
Invitation to Pay Additional Fees and Partial International Search for PCT/US2007/066701, mailed Oct. 18, 2007.
Office Action mailed Nov. 24, 2008 for U.S. Appl. No. 11/442,669.
Notice of Allowability mailed Feb. 10, 2009 for U.S. Appl. No. 11/442,679.
Notice of Allowability mailed Apr. 15, 2009 for U.S. Appl. No. 11/442,669.
Office Action mailed Jan. 27, 2010 for U.S. Appl. No. 11/441,924.
Office Action mailed Feb. 19, 2010 for U.S. Appl. No. 12/362,371.
Office Action mailed Feb. 24, 2010 for U.S. Appl. No. 12/180,342.
U.S. Appl. No. 11/441,924, filed May 25, 2006, and entitled "Article of Footwear Having an Upper With Thread Structural Elements."
U.S. Appl. No. 11/838,011, filed Aug. 13, 2007, and entitled "Article of Footwear Having an Upper With Thread Structural Elements."
U.S. Appl. No. 12/180,235, filed Jul. 25, 2008, and entitled "Composite Element With a Polymer Connecting Layer."
U.S. Appl. No. 12/180,342, filed Jul. 25, 2008, and entitled "Article of Footwear Having an Upper With Thread Structural Elements."
U.S. Appl. No. 12/362,371, filed Jan. 29, 2009, and entitled "Article of Footwear Having an Upper With Thread Structural Elements."
U.S. Appl. No. 12/419,987, filed Apr. 7, 2009, and entitled "Footwear Incorporating Crossed Tensile Strand Elements."
U.S. Appl. No. 12/505,740, filed Jul. 20, 2009, and entitled "Material Elements Incorporating Tensile Strands."
U.S. Appl. No. 12/546,017, filed Aug. 24, 2009, and entitled "Article of Footwear Incorporating a Tensile Element."
U.S. Appl. No. 12/546,019, filed Aug. 24, 2009, and entitled "Article of Footwear Having an Upper Incorporating a Tensile Strand With a Cover Layer."
U.S. Appl. No. 12/546,022, filed Aug. 24, 2009, and entitled "Article of Footwear Incorporating Tensile Strands and Securing Strands."
International Search Report and Written Opinion mailed Dec. 16, 2010 for PCT Application No. PCT/US2010/029308.

* cited by examiner

METHOD FOR MOLDING TENSILE STRAND ELEMENTS

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart different properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

An article of footwear is described below as having an upper and a sole structure secured to the upper. The upper includes various lace-receiving elements, material layers, and strands. At least one of the material layers extends from the lace-receiving elements to the sole structure. Also, a pair of the strands extends from an area proximal to the lace-receiving elements to an area proximal to the sole structure. The strands lie substantially parallel to a surface of the material layer in a region between the lace-receiving elements and the sole structure, and the strands cross each other in the region between the lace-receiving elements and the sole structure.

A method of manufacturing an element, which may be utilized in the footwear, is also described below. The method includes positioning a strand between a first layer and a second layer. The strand, the first layer, and the second layer are located between a first surface and a second surface of a press. The first surface includes a first material and the second surface includes a second material, with the first material having lesser compressibility than the second material. The strand, the first layer, and the second layer are compressed between the first surface and the second surface.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose an article of footwear having an upper that includes tensile strand elements, as well as methods for manufacturing the tensile strand elements. The article of footwear is disclosed as having a general configuration suitable for walking or running. Concepts associated with the footwear, including the upper, may also be applied to a variety of other athletic footwear types, including baseball shoes, basketball shoes, cross-training shoes, cycling shoes, football shoes, tennis shoes, soccer shoes, and hiking boots, for example. The concepts may also be applied to footwear types that are generally considered to be non-athletic, including dress shoes, loafers, sandals, and work boots. The concepts disclosed herein apply, therefore, to a wide variety of footwear types. The tensile strand elements may, however, be utilized in a variety of other products, including backpacks and other bags and apparel (e.g., pants, shirts, headwear), for example. Accordingly, the concepts disclosed herein may apply to a wide variety of products.

General Footwear Structure

Figure 1:
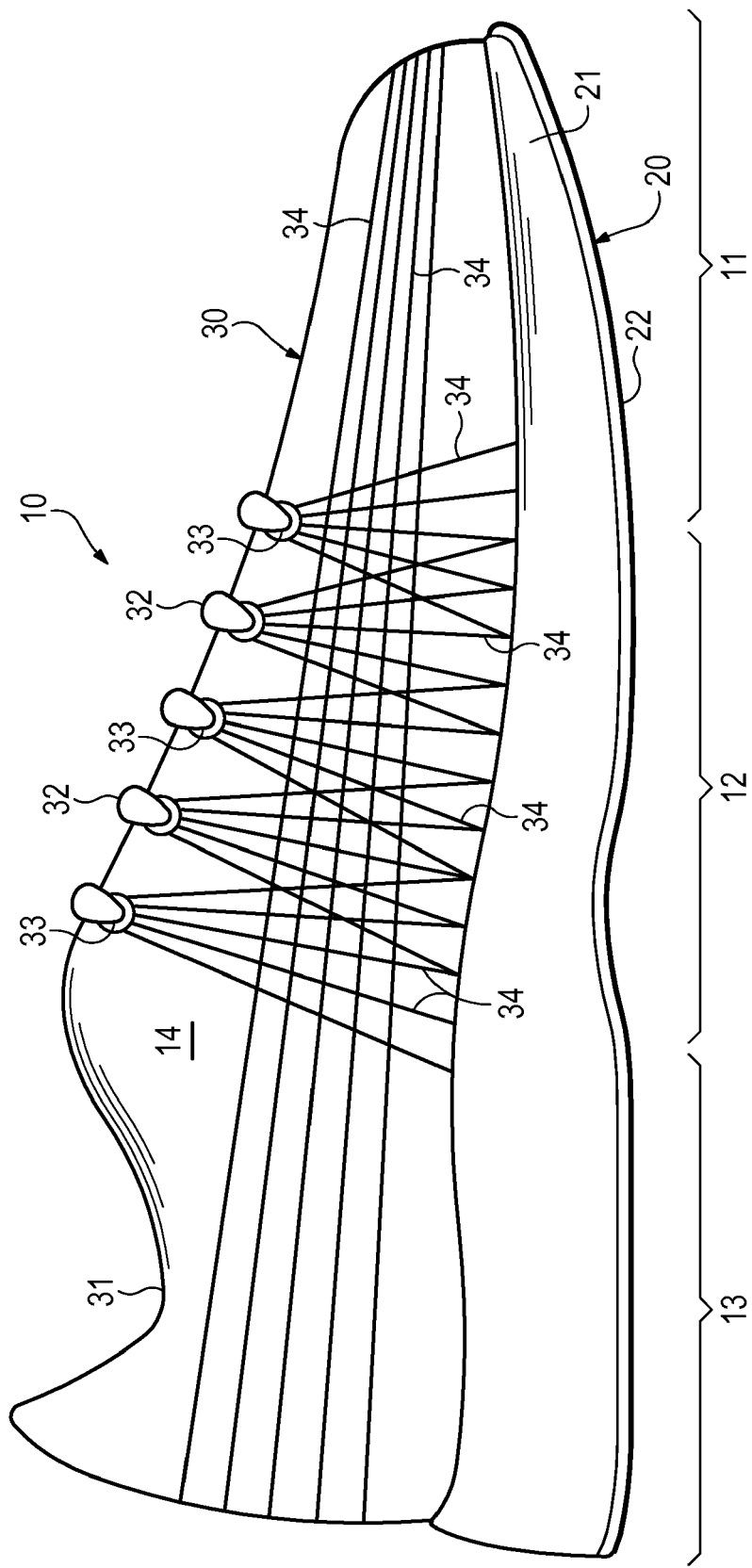
FIG. 1 is a lateral side elevational view of an article of footwear.
Figure 2:
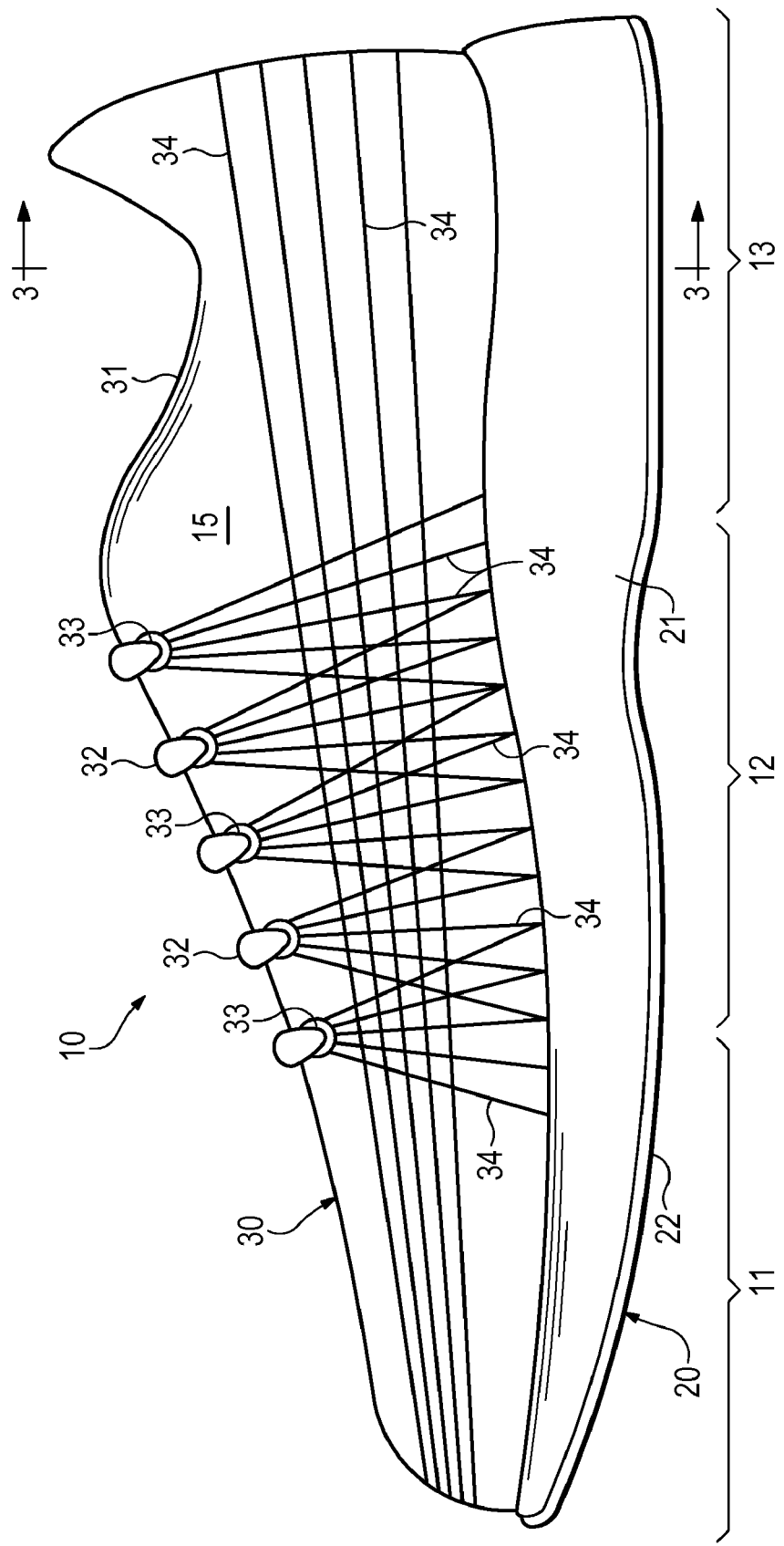
FIG. 2 is a medial side elevational view of the article of footwear.
Figure 3:
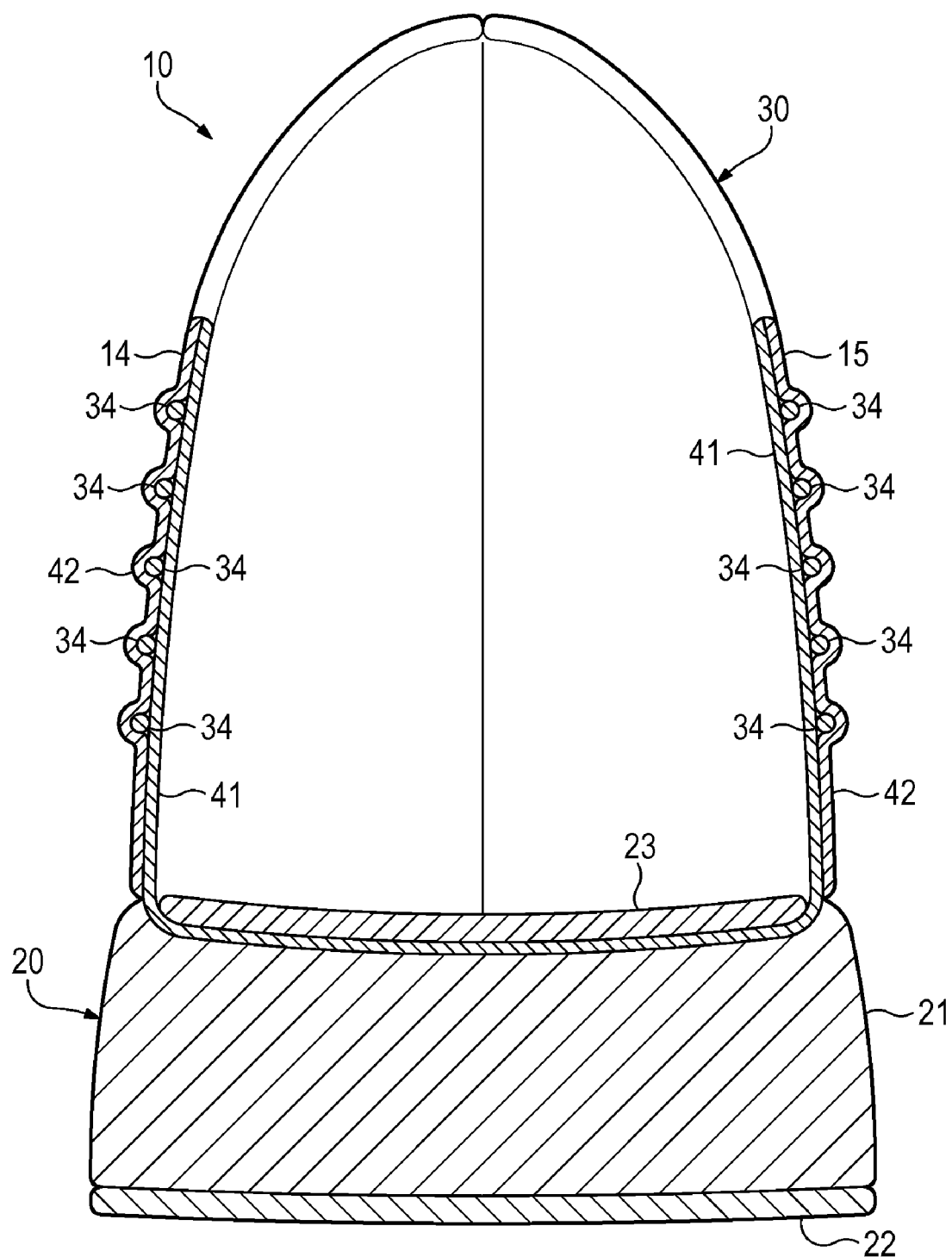
FIG. 3 is a cross-sectional view of the article of footwear, as defined by section line 3-3 in FIG. 2.

As an example of a product that may incorporate the tensile strand elements, an article of footwear 10 is depicted in FIGS. 1-3 as including a sole structure 20 and an upper 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to sole structure 20, upper 30, and individual elements thereof.

Sole structure 20 is secured to upper 30 and extends between the foot and the ground when footwear 10 is worn. The primary elements of sole structure 20 are a midsole 21, an outsole 22, and an sockliner 23. Midsole 21 is secured to a lower surface of upper 30 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 21 may incorporate fluid-filled chambers, plates, moderators, or other elements that further attenuate forces, enhance stability, or influence the motions of the foot, or midsole 21 may be primarily formed from a fluid-filled chamber. Outsole 22 is secured to a lower surface of midsole 21 and may be formed from a wear-resistant rubber material that is textured to impart traction. Sockliner 23 is located within upper 30 and is positioned to extend under a lower surface of the foot. Although this configuration for sole structure 20 provides an example of a sole structure that may be used in connection with upper 30, a variety of other conventional or nonconventional configurations for sole structure 20 may also be utilized. Accordingly, the structure and features of sole structure 20 or any sole structure utilized with upper 30 may vary considerably.

Upper 30 defines a void within footwear 10 for receiving and securing a foot relative to sole structure 20. The void is shaped to accommodate the foot and extends along the lateral side of the foot, along the medial side of the foot, over the foot, around the heel, and under the foot. Access to the void is provided by an ankle opening 31 located in at least heel region 13. A lace 32 extends through various lace apertures 33 and permits the wearer to modify dimensions of upper 30 to accommodate the proportions of the foot. More particularly, lace 32 permits the wearer to tighten upper 30 around the foot, and lace 32 permits the wearer to loosen upper 30 to facilitate entry and removal of the foot from the void (i.e., through ankle opening 31). In addition, upper 30 may include a tongue (not depicted) that extends under lace 32.

The various portions of upper 30 may be formed from one or more of a plurality of material elements (e.g., textiles, polymer sheets, foam layers, leather, synthetic leather) that are stitched or bonded together to form the void within footwear 10. Upper 30 may also incorporate a heel counter that limits heel movement in heel region 13 or a wear-resistant toe guard located in forefoot region 11. Although a variety of material elements or other elements may be incorporated into upper, areas of one or both of lateral side 14 and medial side 15 incorporate various strands 34. Referring to FIGS. 1 and 2, a plurality of strands 34 extend in a generally vertical direction between lace apertures 33 and sole structure 20, and various strands 34 extend in a generally horizontal direction between forefoot region 11 and heel region 13 in both of lateral side 14 and medial side 15. Referring also to FIG. 3, the various strands 34 are located between a base layer 41 and a cover layer 42. Whereas base layer 41 forms a surface of the void within upper 30, cover layer 42 forms a portion of an exterior or exposed surface of upper 30. The combination of strands 34, base layer 41, and cover layer 42 may, therefore, form substantially all of the thickness of upper 30 in some areas.

During walking, running, or other ambulatory activities, a foot within the void in footwear 10 may tend to stretch upper 30. That is, many of the material elements forming upper 30 may stretch when placed in tension by movements of the foot. Although strands 34 may also stretch, strands 34 generally stretch to a lesser degree than the other material elements forming upper 30 (e.g., base layer 41 and cover layer 42). Each of strands 34 may be located, therefore, to form structural components in upper 30 that resist stretching in specific directions or reinforce locations where forces are concentrated. As an example, the various strands 34 that extend between lace apertures 33 and sole structure 20 resist stretch in the medial-lateral direction (i.e., in a direction extending around upper 30). These strands 34 are also positioned adjacent to and radiate outward from lace apertures 33 to resist stretch due to tension in lace 32. Given that these strands also cross each other, forces from the tension in lace 32 or from movement of the foot may be distributed over various areas of upper 30. As another example, the various strands 34 that extend between forefoot region 11 and heel region 13 resist stretch in a longitudinal direction (i.e., in a direction extending through each of regions 11-13). Accordingly, strands 34 are located to form structural components in upper 30 that resist stretch.

Tensile Strand Element

Figure 4:
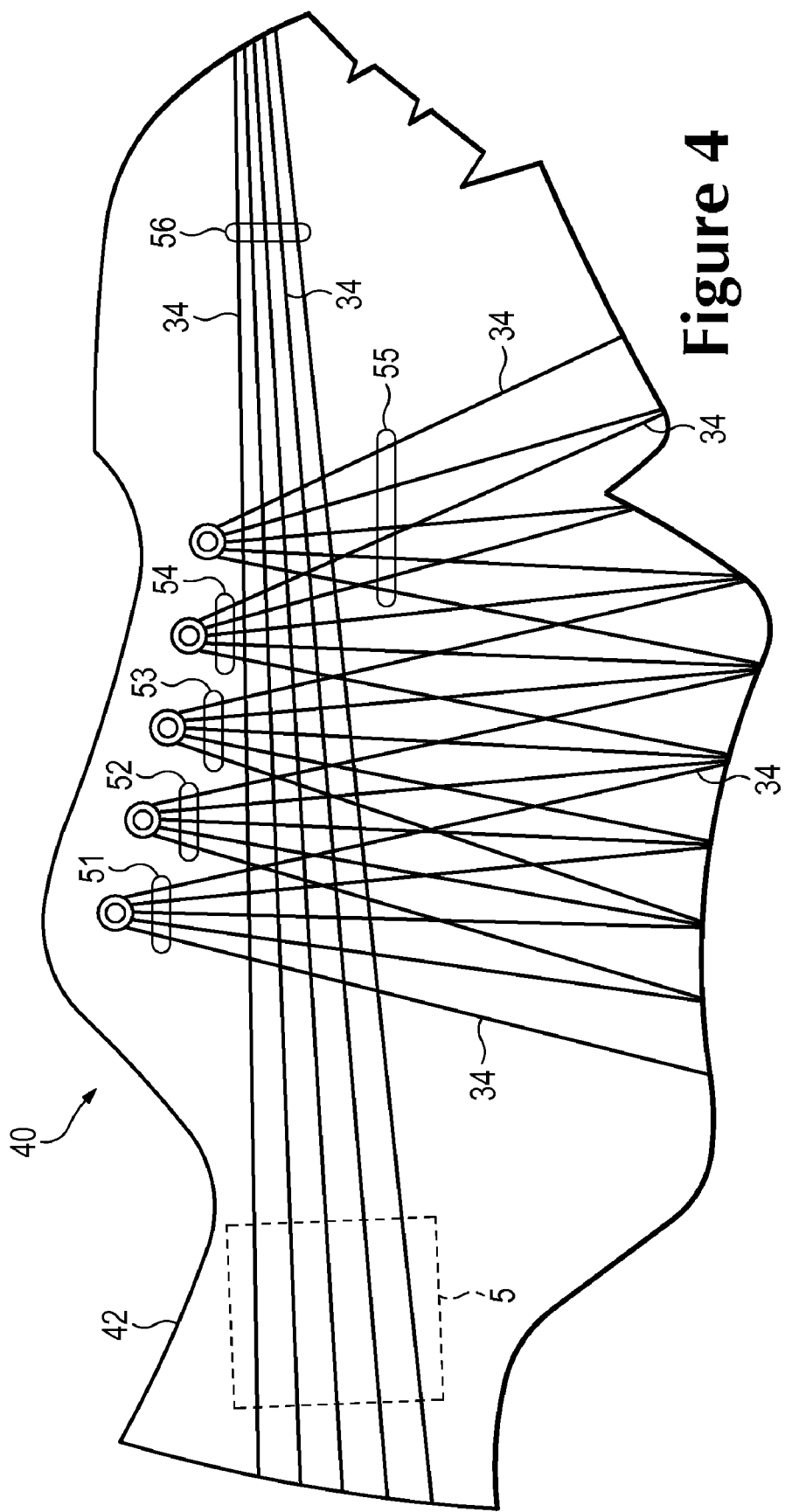
FIG. 4 is a plan view of a tensile strand element utilized in an upper of the article of footwear.
Figure 5:
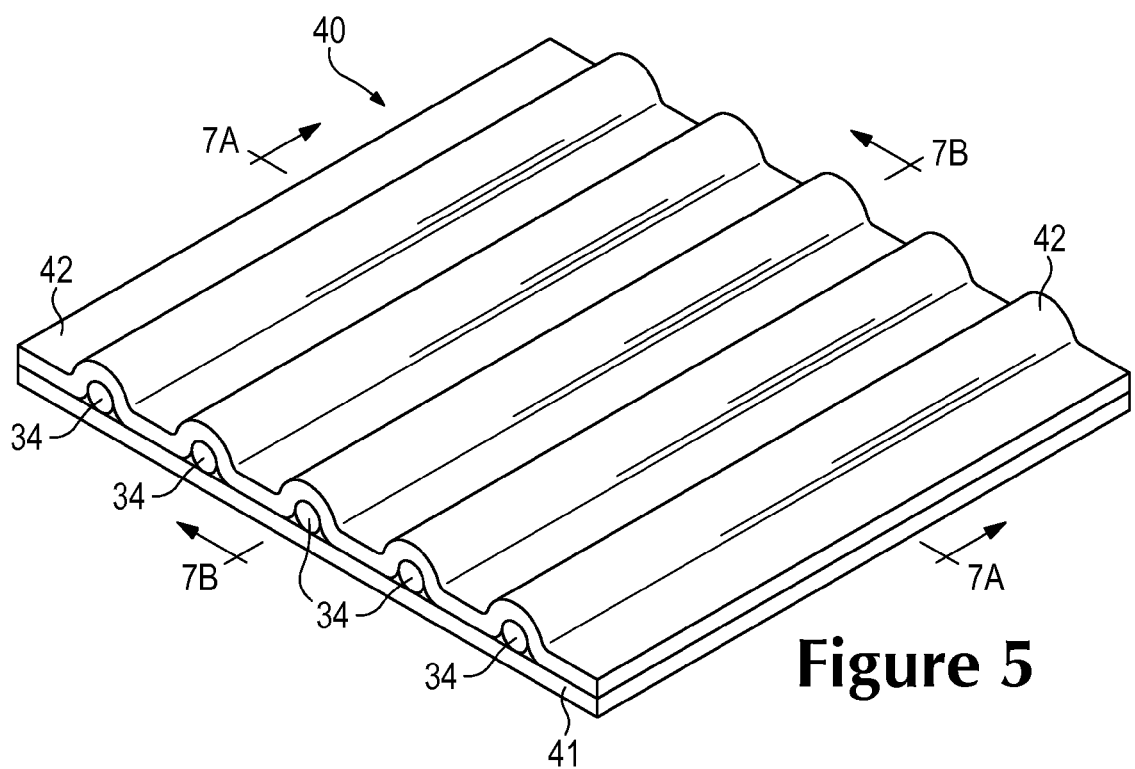
FIG. 5 is a perspective view of a portion of the tensile strand element, as defined in FIG. 4.
Figure 6:
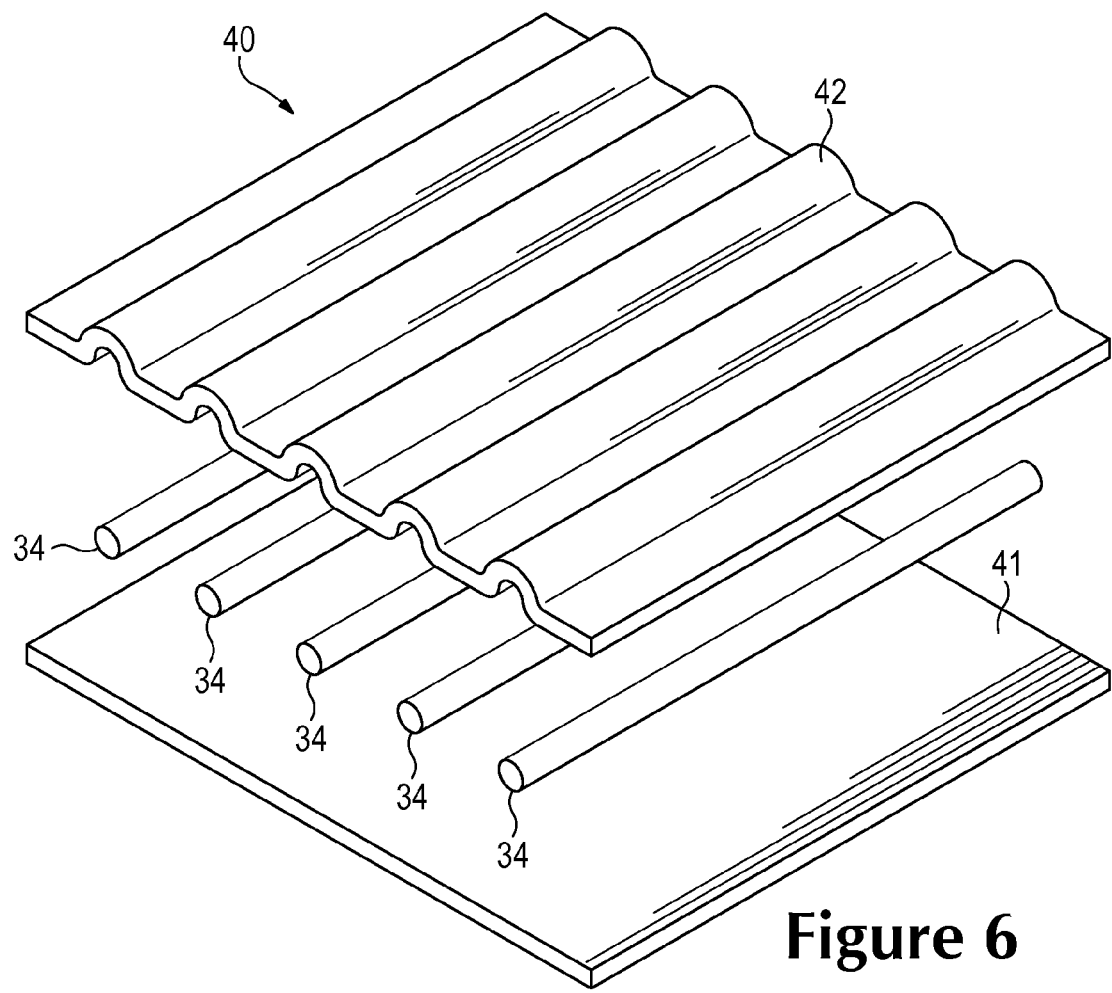
FIG. 6 is an exploded perspective view of the portion of the tensile strand element.
Figure 7A:
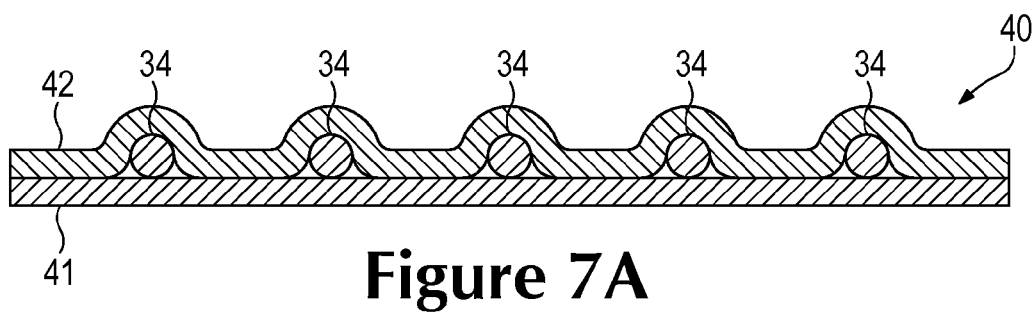
FIGS. 7A and 7B are a cross-sectional views of the portion of the tensile strand element, as defined by section lines 7A and 7B in FIG. 5.
Figure 7B:
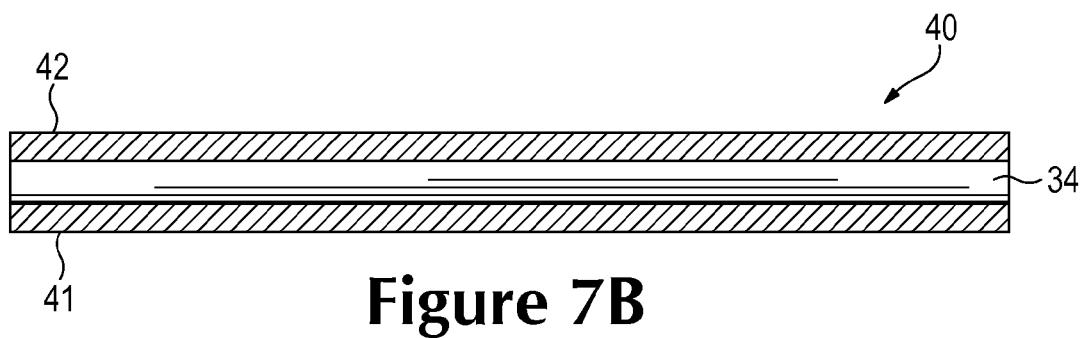

A tensile strand element 40 that may be incorporated into upper 30 is depicted in FIG. 4. Additionally, a portion of element 40 is depicted in each of FIGS. 5-7B. Element 40 may form, for example, a majority of lateral side 14. As a result, element 40 has a configuration that (a) extends from upper to lower areas of lateral side 14 and through each of regions 11-13, (b) defines the various lace apertures 33 in lateral side 14, and (c) forms both an interior surface (i.e., the surface that contacts the foot or a sock worn by the foot when footwear 10 is worn) and an exterior surface (i.e., an outer, exposed surface of footwear 10). A substantially similar element may also be utilized for medial side 15. In some configurations of footwear 10, element 40 may only extend through a portion of lateral side 14 (e.g., limited to midfoot region 12) or may be expanded to form a majority of lateral side 14 and medial side 15. That is, a single element having the general configuration of element 40 and including strands 34 and layers 41 and 42 may extend through both lateral side 14 and medial side 15. In other configurations, additional elements may be joined to element 40 to form portions of lateral side 14.

Element 40 includes base layer 41 and cover layer 42, with strands 34 being positioned between layers 41 and 42. Strands 34 lie adjacent to a surface of base layer 41 and substantially parallel to the surface of base layer 41. In general, strands 34 also lie adjacent to a surface of cover layer 42 and substantially parallel to the surface of cover layer 42. As discussed above, strands 34 form structural components in upper 30 that resist stretch. By being substantially parallel to the surfaces of base layer 41 and cover layer 42, strands 34 resist stretch in directions that correspond with the surfaces of layers 41 and 42. Although strands 34 may extend through base layer 41 (e.g., as a result of stitching) in some locations, areas where strands 34 extend through base layer 41 may permit stretch, thereby reducing the overall ability of strands 34 to limit stretch. As a result, each of strands 34 generally lie adjacent to a surface of base layer 41 and substantially parallel to the surface of base layer 41 for distances of at least twelve millimeters, and may lie adjacent to the surface of base layer 41 and substantially parallel to the surface of base layer 41 throughout distances of at least five centimeters or more.

Base layer 41 and cover layer 42 are depicted as being coextensive with each other. That is, layers 41 and 42 may have the same shape and size, such that edges of base layer 41 correspond and are even with edges of cover layer 42. In some manufacturing processes, (a) strands 34 are located upon base layer 42, (b) cover layer 42 is bonded to base layer 41 and strands 34, and (c) element 40 is cut from this combination to have the desired shape and size, thereby forming common edges for base layer 41 and cover layer 42. In this process, ends of strands 34 may also extend to edges of layers 41 and 42. Accordingly, edges of layers 41 and 42, as well as ends of strands 34, may all be positioned at edges of element 40.

Each of base layer 41 and cover layer 42 may be formed from any generally two-dimensional material. As utilized with respect to the present invention, the term "two-dimensional material" or variants thereof is intended to encompass generally flat materials exhibiting a length and a width that are substantially greater than a thickness. Accordingly, suitable materials for base layer 41 and cover layer 42 include various textiles, polymer sheets, or combinations of textiles and polymer sheets, for example. Textiles are generally manufactured from fibers, filaments, or yarns that are, for example, either (a) produced directly from webs of fibers by bonding, fusing, or interlocking to construct non-woven fabrics and felts or (b) formed through a mechanical manipulation of yarn to produce a woven or knitted fabric. The textiles may incorporate fibers that are arranged to impart one-directional stretch or multi-directional stretch, and the textiles may include coatings that form a breathable and water-resistant barrier, for example. The polymer sheets may be extruded, rolled, or otherwise formed from a polymer material to exhibit a generally flat aspect. Two-dimensional materials may also encompass laminated or otherwise layered materials that include two or more layers of textiles, polymer sheets, or combinations of textiles and polymer sheets. In addition to textiles and polymer sheets, other two-dimensional materials may be utilized for base layer 41 and cover layer 42. Although two-dimensional materials may have smooth or generally untextured surfaces, some two-dimensional materials will exhibit textures or other surface characteristics, such as dimpling, protrusions, ribs, or various patterns, for example. Despite the presence of surface characteristics, two-dimensional materials remain generally flat and exhibit a length and a width that are substantially greater than a thickness. In some configurations, mesh materials or perforated materials may be utilized for either or both of layers 41 and 42 to impart greater breathability or air permeability.

Strands 34 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable materials for strands 34 include various filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, and steel. Whereas filaments have an indefinite length and may be utilized individually as strands 34, fibers have a relatively short length and generally go through spinning or twisting processes to produce a strand of suitable length. An individual filament utilized in strands 34 may be formed form a single material (i.e., a monocomponent filament) or from multiple materials (i.e., a bicomponent filament). Similarly, different filaments may be formed from different materials. As an example, yarns utilized as strands 34 may include filaments that are each formed from a common material, may include filaments that are each formed from two or more different materials, or may include filaments that are each formed from two or more different materials. Similar concepts also apply to threads, cables, or ropes. The thickness of strands 34 may also vary significantly to range from 0.03 millimeters to more than 5 millimeters, for example. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material.

As examples, base layer 41 may be formed from a textile material and cover layer 42 may be formed from a polymer sheet that is bonded to the textile material, or each of layers 41 and 42 may be formed from polymer sheets that are bonded to each other. In circumstances where base layer 41 is formed from a textile material, cover layer 42 may incorporate thermoplastic polymer materials that bond with the textile material of base layer 41. That is, by heating cover layer 42, the thermoplastic polymer material of cover layer 42 may bond with the textile material of base layer 41. As an alternative, a thermoplastic polymer material may infiltrate or be bonded with the textile material of base layer 41 in order to bond with cover layer 42. That is, base layer 41 may be a combination of a textile material and a thermoplastic polymer material. An advantage of this configuration is that the thermoplastic polymer material may rigidify or otherwise stabilize the textile material of base layer 41 during the manufacturing process of element 40, including portions of the manufacturing process involving lying strands 34 upon base layer 41. Another advantage of this configuration is that a backing layer (see backing layer 37 in FIG. 9D) may be bonded to base layer 41 opposite cover layer 42 using the thermoplastic polymer material in some configurations. This general concept is disclosed in U.S. patent application Ser. No. 12/180,235, which was filed in the U.S. Patent and Trademark Office on 25 Jul. 2008 and entitled Composite Element With A Polymer Connecting Layer, such prior application being entirely incorporated herein by reference.

Based upon the above discussion, element 40 generally includes two layers 41 and 42 with strands 34 located between. Although strands 34 may pass through one of layers 41 and 42, strands 34 generally lie adjacent to surfaces of layers 41 and 42 and substantially parallel to the surfaces layers 41 and 42 for more than twelve millimeters and even more than five millimeters. Whereas a variety of one dimensional materials may be used for strands 34, one or more two dimensional materials may be used for layers 41 and 42.

Structural Components

A conventional upper may be formed from multiple material layers that each impart different properties to various areas of the upper. During use, an upper may experience significant tensile forces, and one or more layers of material are positioned in areas of the upper to resist the tensile forces. That is, individual layers may be incorporated into specific portions of the upper to resist tensile forces that arise during use of the footwear. As an example, a woven textile may be incorporated into an upper to impart stretch resistance in the longitudinal direction. A woven textile is formed from yarns that interweave at right angles to each other. If the woven textile is incorporated into the upper for purposes of longitudinal stretch-resistance, then only the yarns oriented in the longitudinal direction will contribute to longitudinal stretch-resistance, and the yarns oriented orthogonal to the longitudinal direction will not generally contribute to longitudinal stretch-resistance. Approximately one-half of the yarns in the woven textile are, therefore, superfluous to longitudinal stretch-resistance. As an extension of this example, the degree of stretch-resistance required in different areas of the upper may vary. Whereas some areas of the upper may require a relatively high degree of stretch-resistance, other areas of the upper may require a relatively low degree of stretch-resistance. Because the woven textile may be utilized in areas requiring both high and low degrees of stretch-resistance, some of the yarns in the woven textile are superfluous in areas requiring the low degree of stretch-resistance. In this example, the superfluous yarns add to the overall mass of the footwear, without adding beneficial properties to the footwear. Similar concepts apply to other materials, such as leather and polymer sheets, that are utilized for one or more of wear-resistance, flexibility, air-permeability, cushioning, and moisture-wicking, for example.

As a summary of the above discussion, materials utilized in the conventional upper formed from multiple layers of material may have superfluous portions that do not significantly contribute to the desired properties of the upper. With regard to stretch-resistance, for example, a layer may have material that imparts (a) a greater number of directions of stretch-resistance or (b) a greater degree of stretch-resistance than is necessary or desired. The superfluous portions of these materials may, therefore, add to the overall mass and cost of the footwear, without contributing significant beneficial properties.

In contrast with the conventional layered construction discussed above, upper 30 is constructed to minimize the presence of superfluous material. Base layer 41 and cover layer 42 provide a covering for the foot, but exhibit a relatively low mass. Strands 34 are positioned to provide stretch-resistance in particular directions and locations, and the number of strands 34 is selected to impart the desired degree of stretch-resistance. Accordingly, the orientations, locations, and quantity of strands 34 are selected to provide structural components that are tailored to a specific purpose.

For purposes of reference in the following discussion, six strand groups 51-56 are identified in FIG. 2. Strand group 51 includes the various strands 34 extending downward from the lace aperture 33 closest to ankle opening 31. Strand group 52 includes the various strands 34 extending downward from the lace aperture 33 second closest to ankle opening 31. Similarly, strand groups 53-55 include the various strands 34 extending downward from other lace apertures 33. Additionally, strand group 56 includes the various strands 34 that extend between forefoot region 11 and heel region 13.

As discussed above, the various strands 34 that extend between lace apertures 33 and sole structure 20 resist stretch in the medial-lateral direction and distribute forces from lace 32. More particularly, the various strands 34 in strand group 51 cooperatively resist stretch from the portion of lace 32 that extends through the lace aperture 33 closest to ankle opening 31. Strand group 51 also radiates outward when extending away from lace aperture 33, thereby distributing the forces from lace 32 over an area of upper 30. Similar concepts also apply to strand groups 52-55. As an additional matter, some of strands 34 from strand groups 51-55 cross strands 34 from other strand groups 51-55. More particularly, (a) strands 34 from strand group 51 cross strands 34 from strand group 52, (b) strands 34 from strand group 52 cross strands 34 from each of strand groups 51 and 53, (c) strands 34 from strand group 53 cross strands 34 from each of strand groups 52 and 54, (d) strands 34 from strand group 54 cross strands 34 from each of strand groups 53 and 55, and (e) strands 34 from strand group 55 cross strands 34 from strand group 54. Accordingly, strands 34 from adjacent strand groups 51-55 may cross each other. Although one strand 34 from one of strand groups 51-55 may cross another strand from a different one of strand groups 51-55 in some configurations, sometimes at least two strands 34 or at least three strands 34 may cross. An advantage of this configuration is that forces from lace 32 at the various lace apertures 33 may be distributed more widely throughout upper 30, and forces from lace 32 at adjacent lace apertures 33 may be distributed to areas covered by strands 34 from other lace apertures 33. In general, therefore, the crossing of strands 34 from different strand groups 51-55 may distribute forces from lace 32 more evenly over areas of upper 30.

Lace apertures 33 provide one example of a lace-receiving element from which strands 34 may extend. In other configurations of footwear 10, metal or textile loops may be utilized in place of lace apertures 33, hooks may be utilized in place of lace apertures 33, or grommets may define lace apertures 33. Accordingly, strands 34 may extend between a variety of lace-receiving elements and sole structure 20 resist stretch in the medial-lateral direction and distribute forces from lace 32.

As also discussed above, the various strands 34 that extend between forefoot region 11 and heel region 13 resist stretch in the longitudinal direction. More particularly, the various strands 34 in strand group 56 cooperatively resist stretch in the longitudinal direction, and the number of strands 34 in strand group 56 are selected to provide a specific degree of stretch-resistance through regions 11-13. Additionally, strands 34 in strand group 56 also cross over each of the strands 34 in strand groups 51-55 to impart a relatively continuous stretch resistance through regions 11-13.

Depending upon the specific configuration of footwear 10 and the intended use of footwear 10, layers 41 and 42 may be non-stretch materials, materials with one-directional stretch, or materials with two-directional stretch, for example. In general, forming layers 41 and 42 from materials with two-directional stretch provides upper 30 with a greater ability to conform with the contours of the foot, thereby enhancing the comfort of footwear 10. In configurations where layers 41 and 42 have two-directional stretch, the combination of strands 34 with layers 41 and 42 effectively varies the stretch characteristics of upper 30 in specific locations. With regard to upper 30, the combination of strands 34 with layers 41 and 42 having two-directional stretch forms zones in upper 30 that have different stretch characteristics, and the zones include (a) first zones where no strands 34 are present and upper 30 exhibits two-directional stretch, (b) second zones where strands 34 are present and do not cross each other, and upper 30 exhibits one-directional stretch in a direction that is orthogonal (i.e., perpendicular) to strands 34, and (c) third zones where strands 34 are present and cross each other, and upper 30 exhibits substantially no stretch or limited stretch. Accordingly, the overall stretch characteristics of particular areas of upper 30 may be controlled by presence of strands 34 and whether strands 34 cross each other.

Based upon the above discussion, strands 34 may be utilized to form structural components in upper 30. In general, strands 34 resist stretch to limit the overall stretch in upper 30. Strands 34 may also be utilized to distribute forces (e.g., forces from lace 32 and lace apertures 33) to different areas of upper 30. Accordingly, the orientations, locations, and quantity of strands 34 are selected to provide structural components that are tailored to a specific purpose. Moreover, the orientations of strands 34 relative to each other and whether strands 34 cross each other may be utilized to control the directions of stretch in different portions of upper 30.

Further Footwear Configurations

Figure 8A:
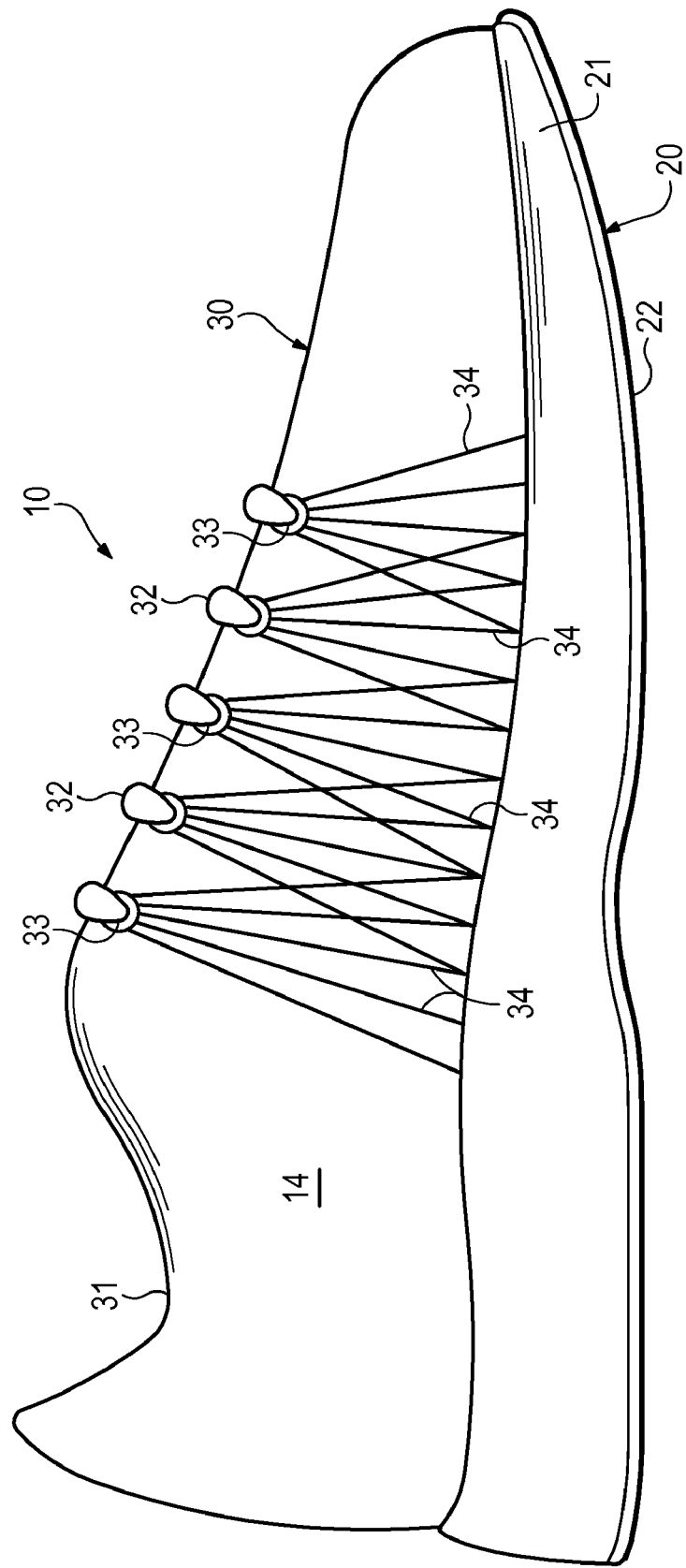
FIGS. 8A-8E are lateral side elevational views corresponding with FIG. 1 and depicting further configurations of the article of footwear.
Figure 8B:
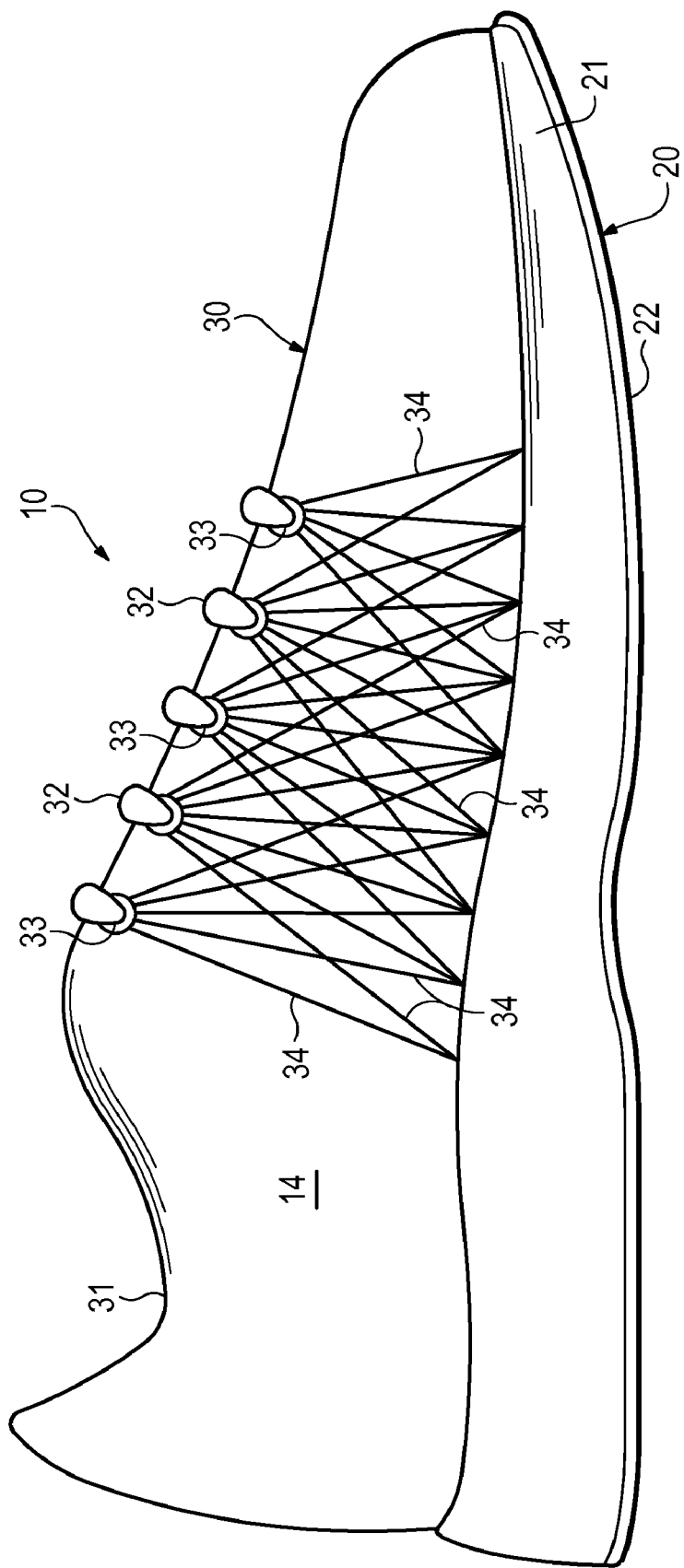
Figure 8C:
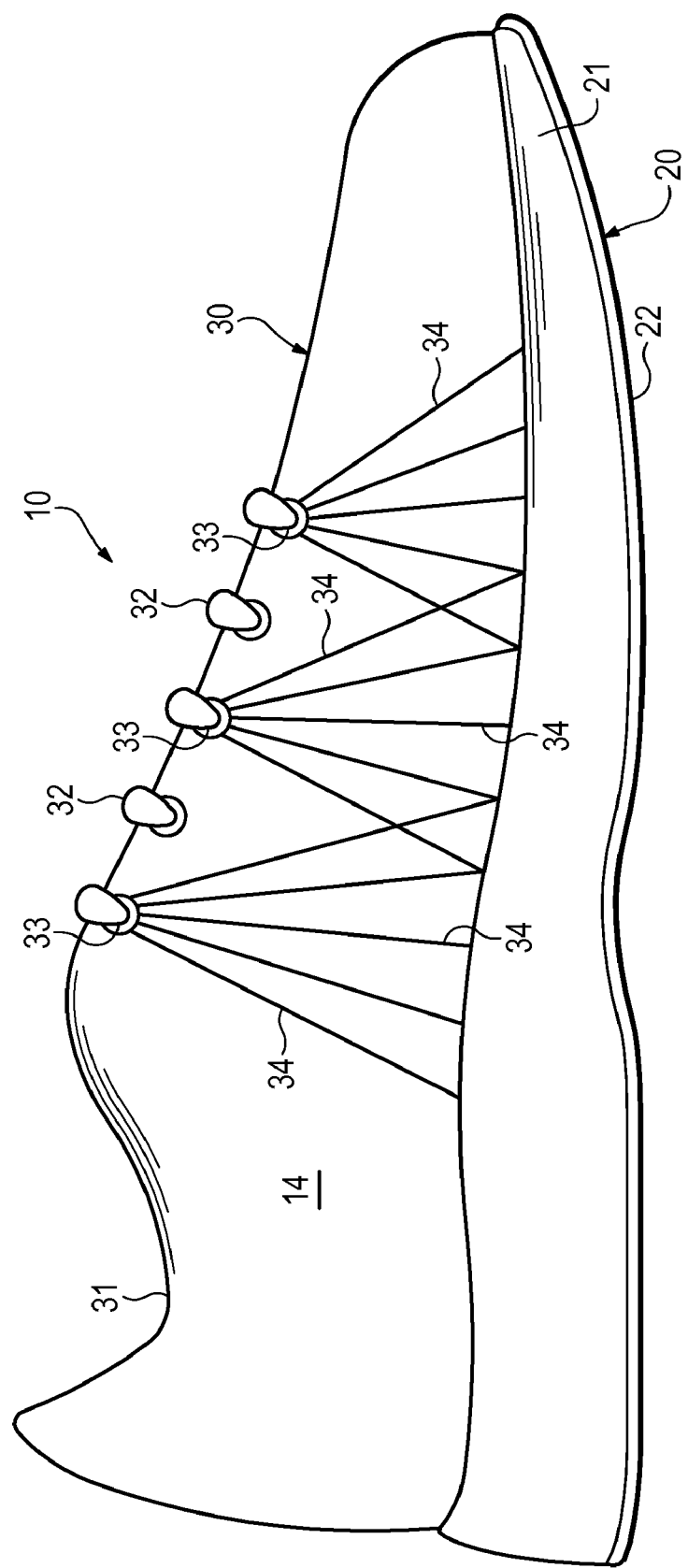
Figure 8D:
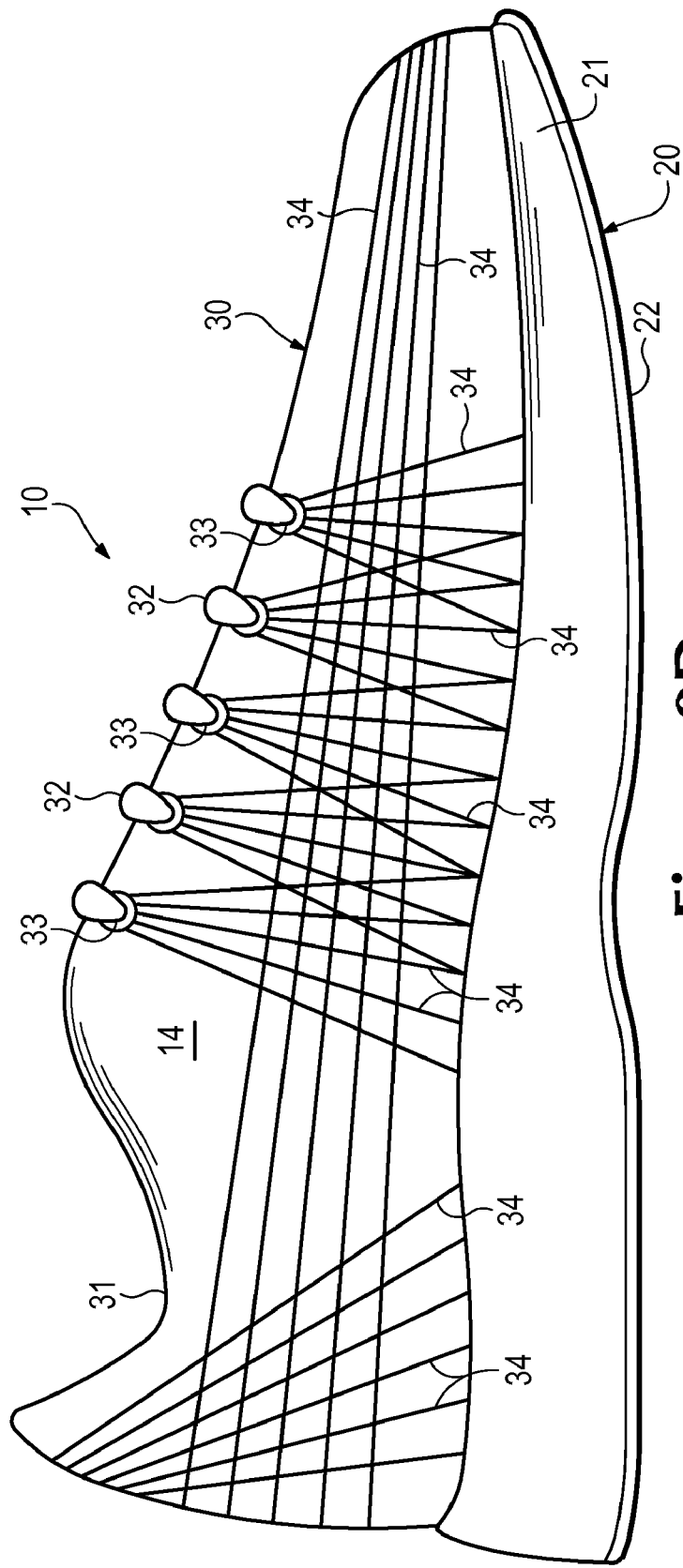
Figure 8E:
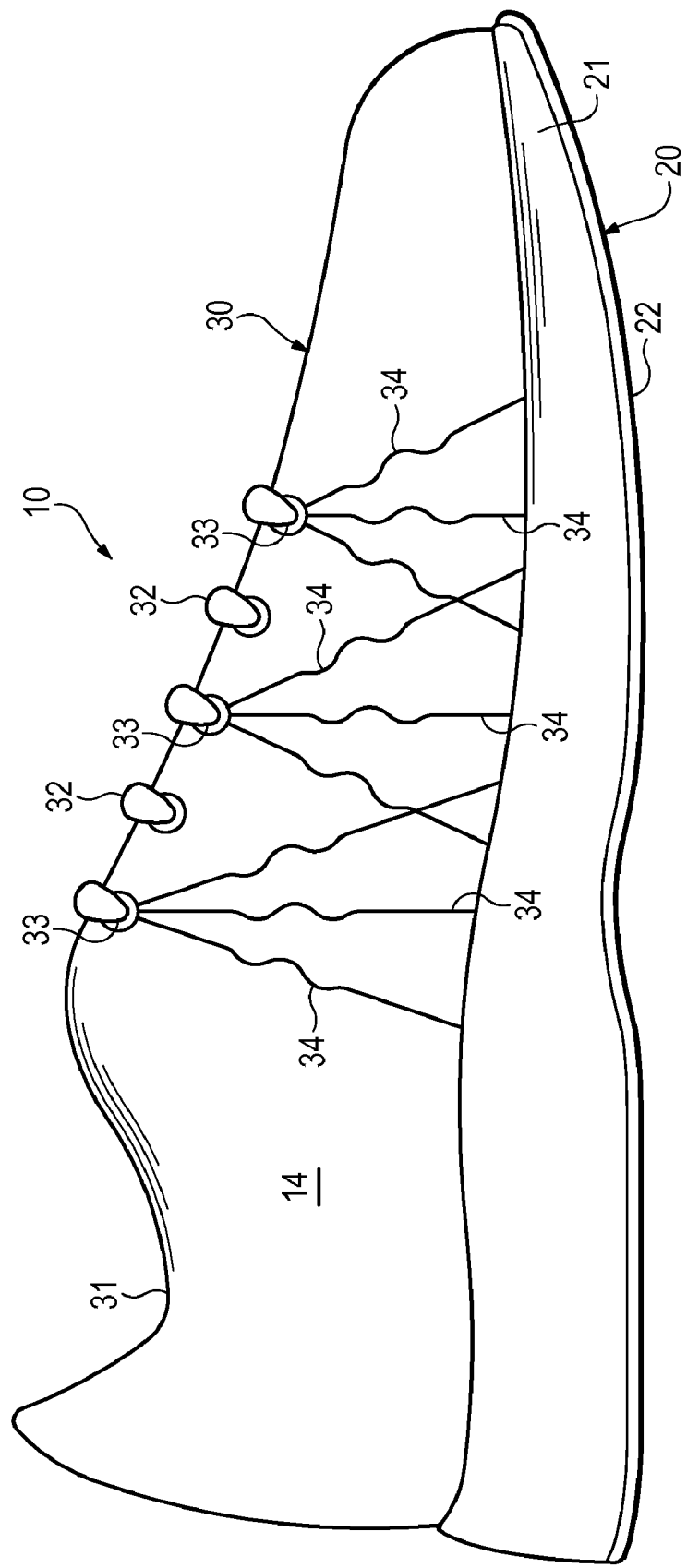

The orientations, locations, and quantity of strands 34 in FIGS. 1 and 2 are intended to provide an example of a suitable configuration for footwear 10. In other configurations of footwear 10, various strands 34 or strand groups 51-56 may be absent, or additional strands 34 or strand groups may be present to provide further structural components in footwear 10. Referring to FIG. 8A, strands 34 extending between forefoot region 11 and heel region 13 are absent, which may enhance the longitudinal stretch of footwear 10. A configuration wherein strands 34 extending between lace apertures 33 and sole structure 20 radiate outward to a greater degree and cross strands 34 from adjacent strand groups as well as strand groups that are spaced even further apart is depicted in FIG. 8B. This configuration may, for example, distribute forces from lace 32 to an even wider area of upper 30. Referring to FIG. 8C, strands 34 extend downward from only some of lace apertures 33, but still cross strands 34 from other strand groups. A configuration that includes additional strands 34 in heel region 13, which may effectively form a heel counter, is depicted in FIG. 8D. Although strands 34 may generally be linear, a configuration wherein portions of strands 34 are wavy or otherwise non-linear is depicted in FIG. 8E. As discussed above, strands 34 may resist stretch in upper 30, but the non-linear areas of strands 34 may allow some stretch in upper 30. As strands 34 straighten due to the stretch, however, strands 34 may then resist stretch in upper 30.

Figure 9A:
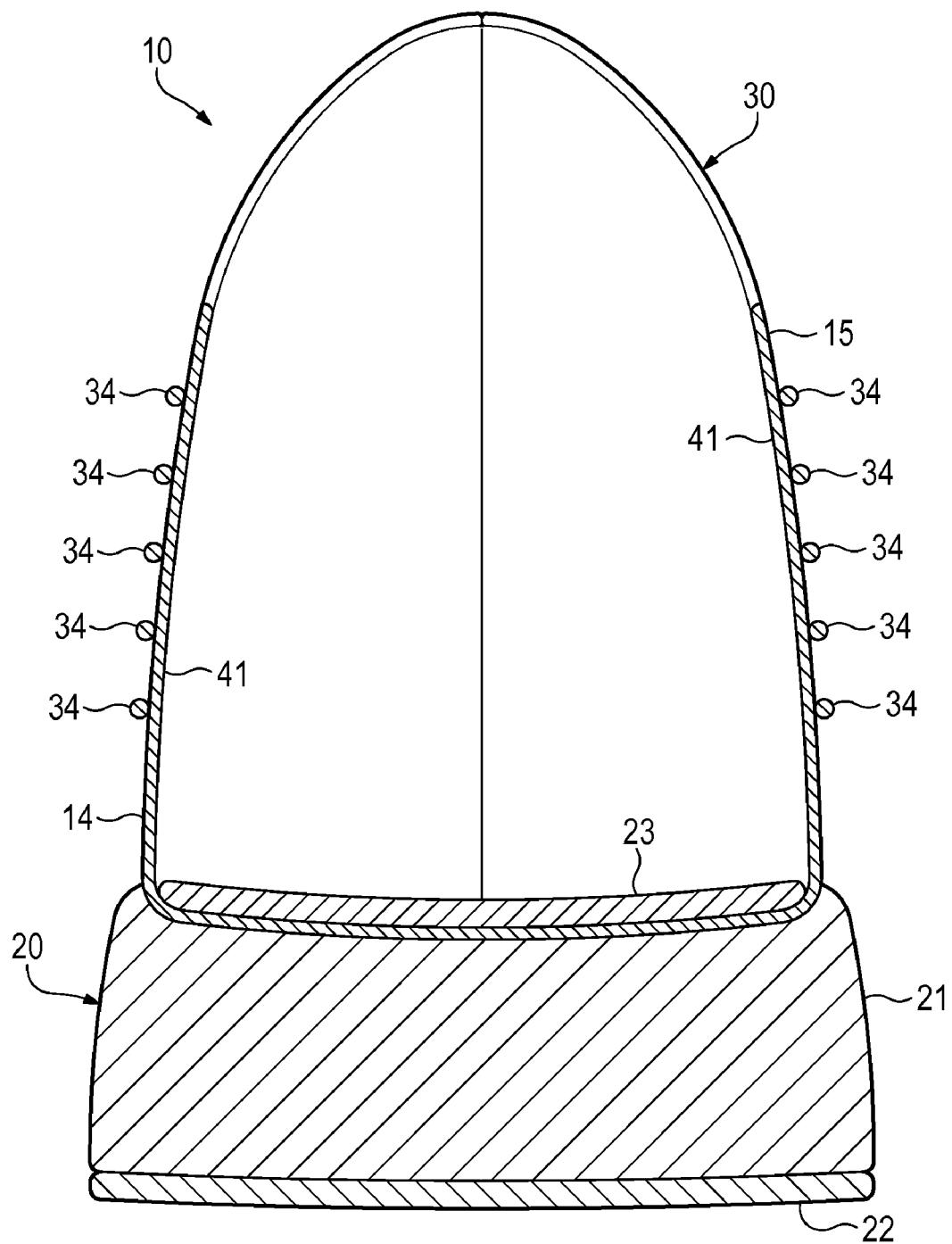
FIGS. 9A-9D are cross-sectional views corresponding with FIG. 3 and depicting further configurations of the article of footwear.
Figure 9B:
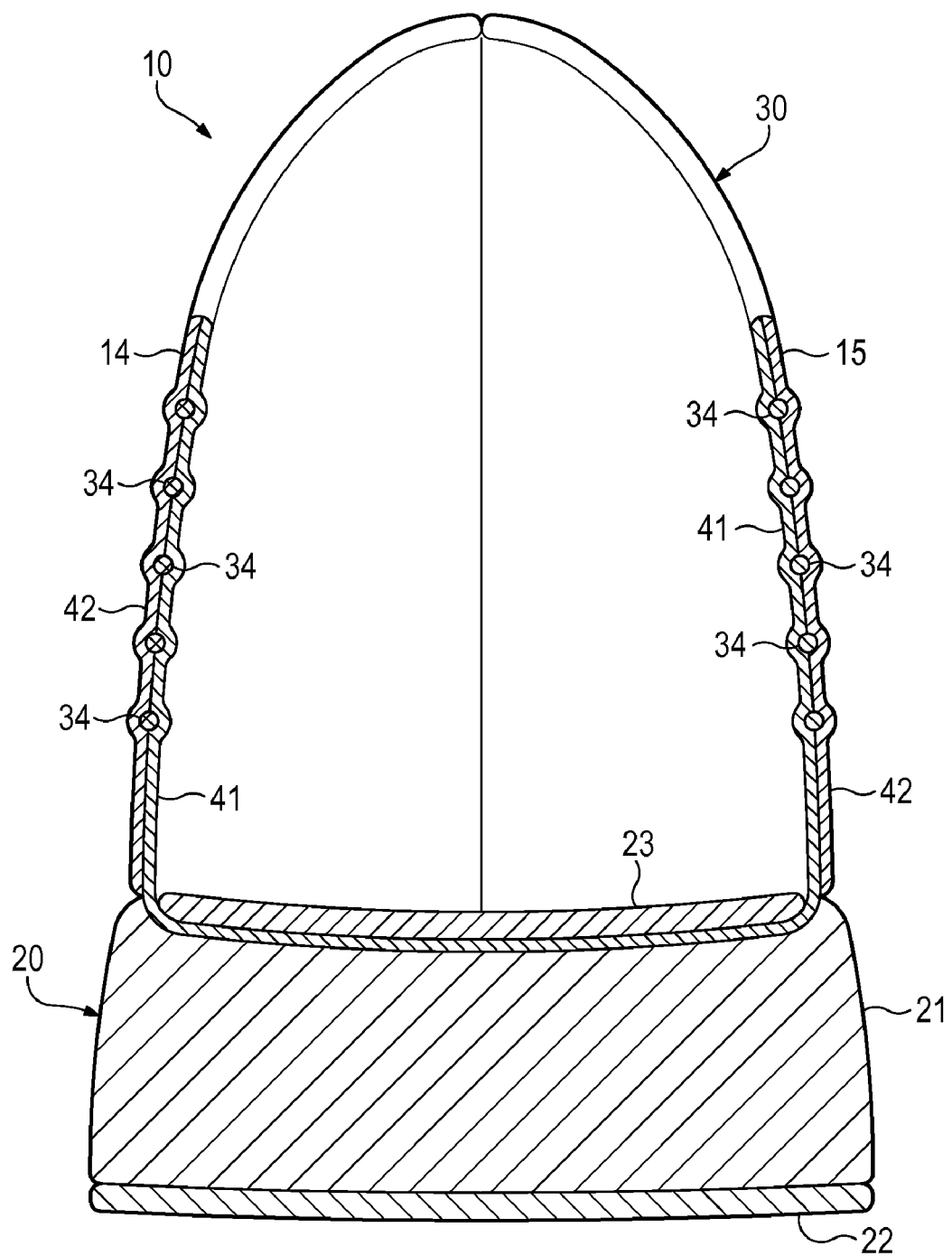
Figure 9C:
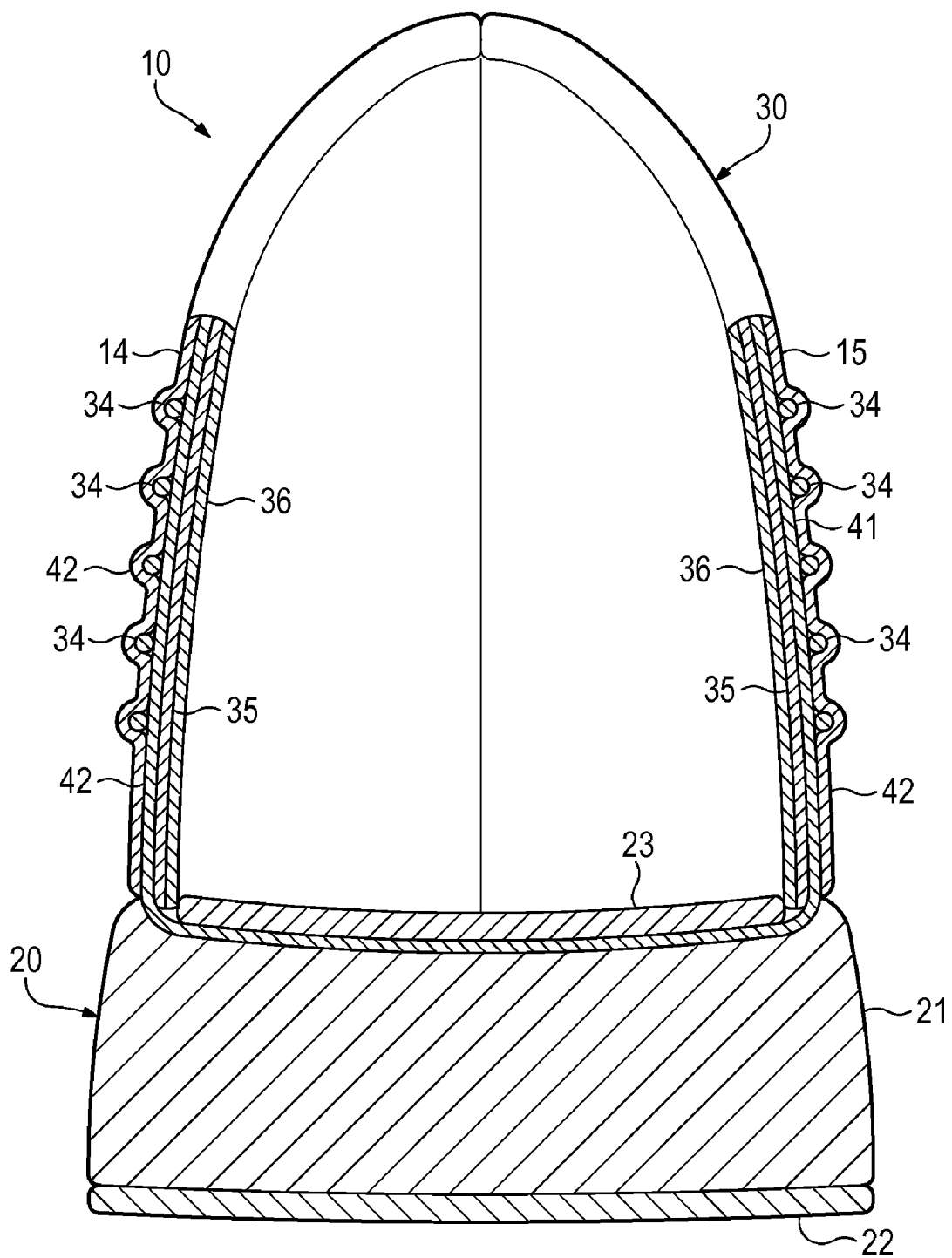
Figure 9D:
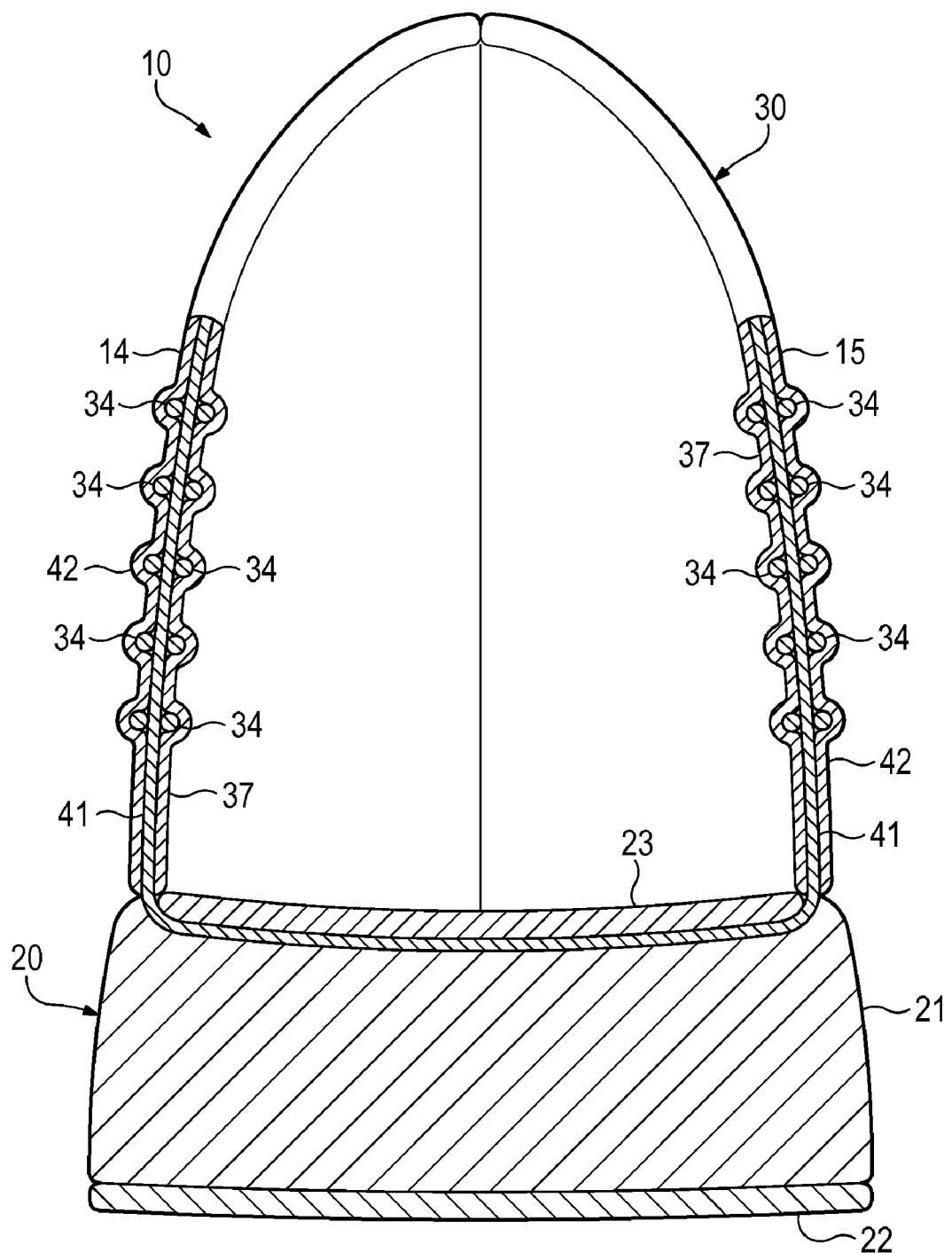

Various aspects relating to strands 34 and layers 41 and 42 in FIG. 3 are intended to provide an example of a suitable configuration for footwear 10. In other configurations of footwear 10, additional layers or the positions of strands 34 with respect to layers 41 and 42 may vary. Referring to FIG. 9A, cover layer 42 is absent such that strands 34 are exposed on an exterior of upper 30. In this configuration, adhesives or a thermoplastic polymer material that infiltrates base layer 41, as discussed above, may be utilized to secure strands 34 to base layer 41. In FIG. 3, base layer 41 is substantially planar, whereas cover layer 42 protrudes outward in the areas of strands 34. Referring to FIG. 9B, both of layers 41 and 42 protrude outward due to the presence of strands 34. In another configuration, depicted in FIG. 9C, additional layers 35 and 36 are located to form an interior portion of upper 30 that is adjacent to the void. Although layers 35 and 36 may be formed from various materials, layer 35 may be a polymer foam layer that enhances the overall comfort of footwear 10 and layer 36 may be a moisture-wicking textile that removes perspiration or other moisture from the area immediately adjacent to the foot. Referring to FIG. 9D, an additional set of strands 34 is located on an opposite side of base layer 41, with a backing layer 37 extending over the additional set of strands 34. This configuration may arise when an embroidery process is utilized to locate strands 34.

The running style or preferences of an individual may also determine the orientations, locations, and quantity of strands 34. For example, some individuals may have a relatively high degree of pronation (i.e., an inward roll of the foot), and having a greater number of strands 34 on lateral side 14 may reduce the degree of pronation. Some individuals may also prefer greater longitudinal stretch resistance, and footwear 10 may be modified to include further strands 34 that extend between regions 11-13 on both sides 14 and 15. Some individuals may also prefer that upper 30 fit more snugly, which may require adding more strands 34 throughout upper 30. Accordingly, footwear 10 may be customized to the running style or preferences of an individual through changes in the orientations, locations, and quantity of strands 34.

Although element 40 is disclosed above in relation to footwear 10, the concepts associated with element 40 may apply to a wide variety of footwear types. Element 40 or similar tensile strand elements may also be utilized in a variety of other products, including backpacks and other bags and apparel, for example. Accordingly, the concepts disclosed above for element 40 may apply to a wide variety of products.

Manufacturing Method

A variety of methods may be utilized to manufacture upper 30 and, particularly, element 40. As an example, an embroidery process may be utilized to locate strands 34 relative to base layer 41. Once strands 34 are positioned, cover layer 42 may be bonded to base layer 41 and strands 34, thereby securing strands 34 within element 40. This general process is described in detail in U.S. patent application Ser. No. 11/442,679, which was filed in the U.S. Patent and Trademark Office on 25 May 2006 and entitled Article Of Footwear Having An Upper With Thread Structural Elements, such prior application being entirely incorporated herein by reference. As an alternative to an embroidery process, other stitching processes may be utilized to locate strands 34 relative to base layer 41, such as computer stitching. Additionally, processes that involve winding strands 34 around pegs on a frame around base layer 41 may be utilized to locate strands 34 over base layer 41. Accordingly, a variety of methods may be utilized to locate strands 34 relative to base layer 41.

Footwear comfort is generally enhanced when the surfaces of upper 30 forming the void have are relatively smooth or otherwise continuous configurations. In other words, seams, protrusions, ridges, and other discontinuities may cause discomfort to the foot. Referring to FIG. 3, base layer 41 has a relatively smooth aspect, whereas cover layer 42 protrudes outward in the areas of strands 34. In contrast, FIG. 9B depicts a configuration wherein base layer 41 and cover layer 42 protrude outward in the areas of strands 34. In general, the configuration of FIG. 3 may impart greater footwear comfort due to the greater smoothness to the surface forming the void within upper 30.

Figure 10A:
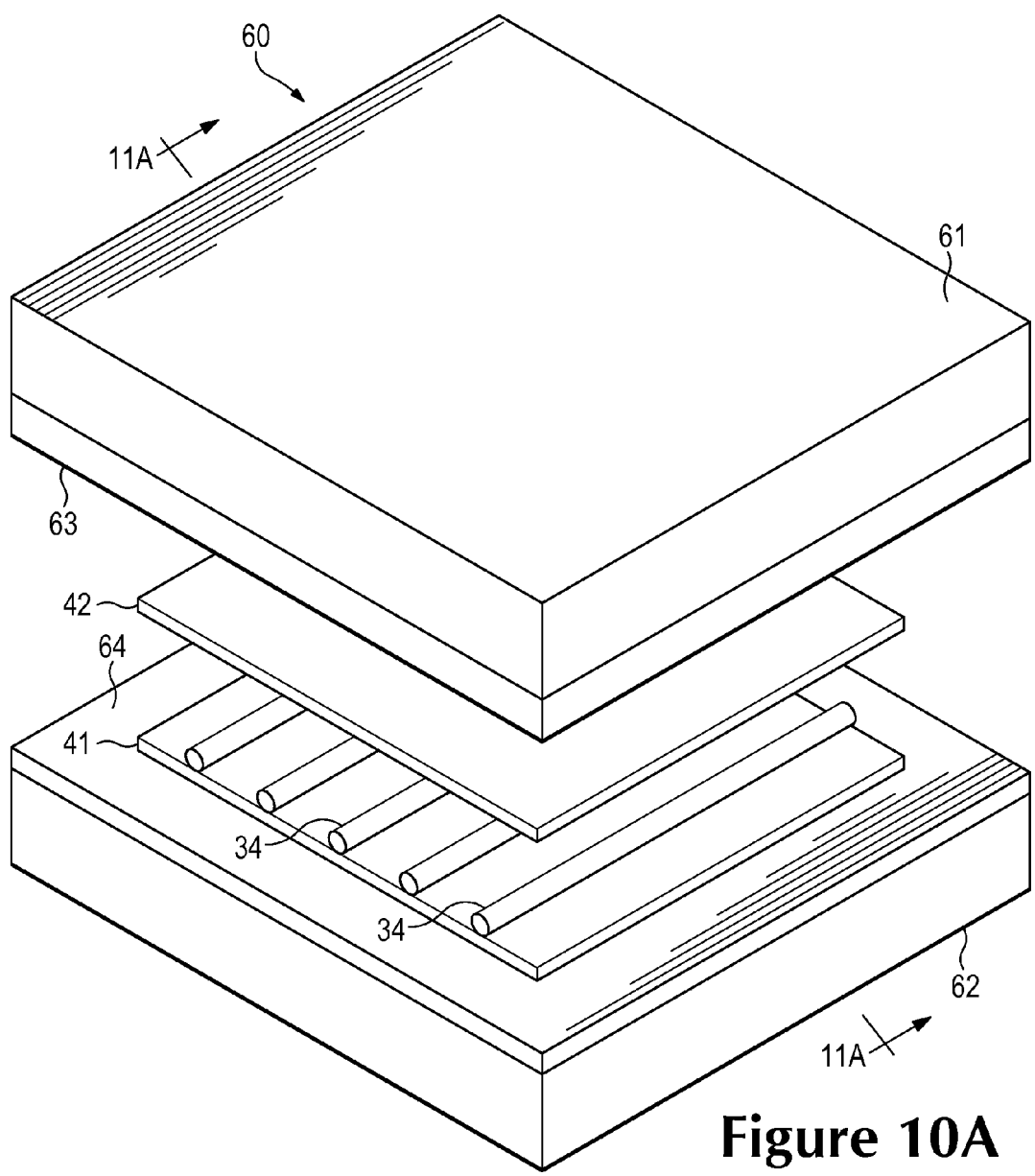
FIGS. 10A-10D are schematic perspective views of a molding method for manufacturing the tensile strand element.
Figure 11A:
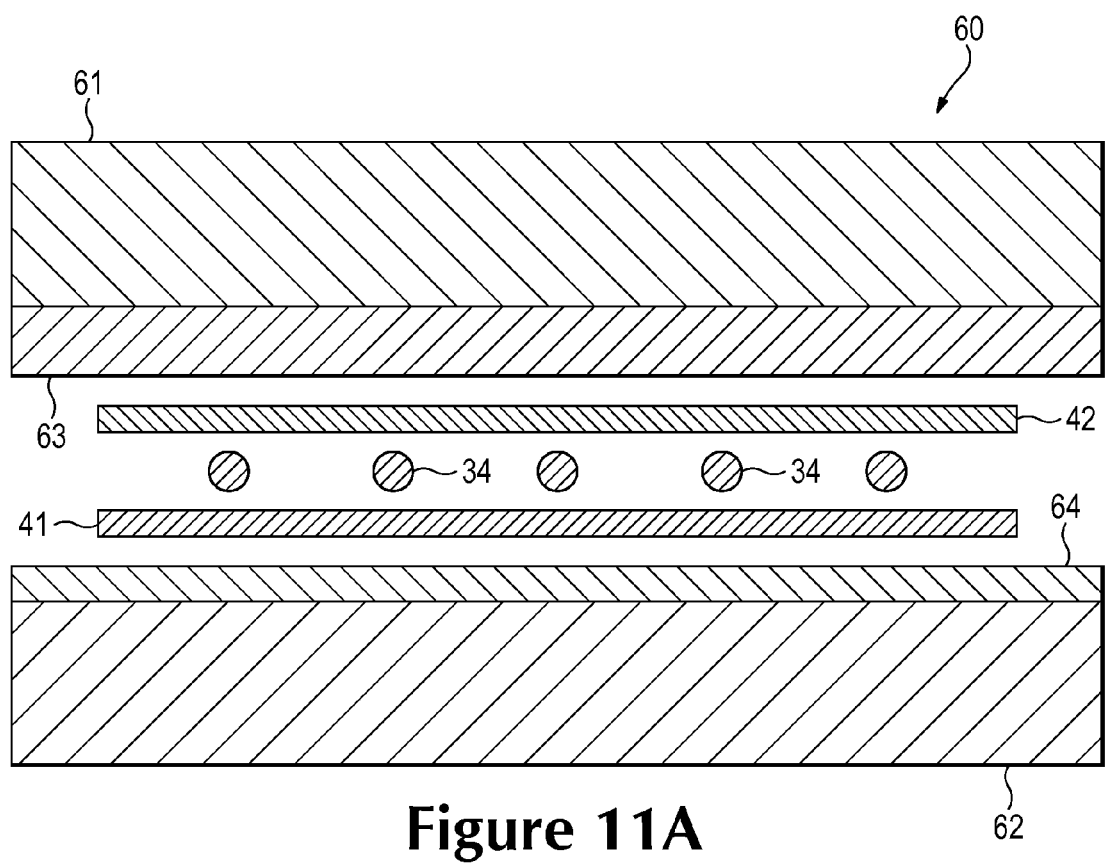
FIGS. 11A-11D are schematic cross-sectional views of the molding method, respectively defined by section lines 11A-11D in FIGS. 10A-10D.

A molding process that may be utilized to form the configuration of FIG. 3 will now be discussed. With reference to FIGS. 10A and 11A, a mold 60 is depicted as including a first mold portion 61 and a second mold portion 62, that effectively form a press or other molding apparatus. Each of mold portions 61 and 62 have facing surfaces that, as described below, compress strands 34 and layers 41 and 42. The surfaces of mold portions 61 and 62 that compress the components of element 40 each include materials with different densities and hardnesses. More particularly, first mold portion 61 includes a material 63 and second mold portion 62 includes a material 64. In comparison, material 63 has a lesser hardness and a lesser density than material 64 and, as a result, material 63 compresses more easily than material 64. As an example of suitable materials, material 63 may be silicone with a hardness of 15 on the Shore A hardness scale, whereas material 64 may be silicone with a hardness of 70 on the Shore A hardness scale. In some configurations of mold 60, material 63 may have a Shore A hardness less than 40, whereas material 64 may have a Shore A hardness greater than 40. In other configurations of mold 60, material 63 may have a Shore A hardness between 5 and 20, whereas material 64 may have a Shore A hardness between 40 and 80. A variety of other materials may also be utilized, including various polymers and foams, such as ethylvinylacetate and rubber. An advantage to silicone, however, relates to compression set. More particularly, silicone may go through repeated molding operations without forming indentations or other surface irregularities due to repeated compressions.

In addition to differences in the densities and hardnesses of materials 63 and 64, the thicknesses may also vary. Referring to FIGS. 11A-11D, for example, material 63 has greater thickness than material 64. In configurations where material 63 is silicone with a hardness of 15 on the Shore A hardness scale and material 64 is silicone with a hardness of 70 on the Shore A hardness scale, material 63 may have a thickness of 5 millimeters and material 64 may have a thickness of 2 millimeters. In other configurations of mold 60, material 63 may have a thickness between 3 and 10 millimeters or more, and material 64 may have a thickness between 1 and 4 millimeters.

Mold 60 is utilized to form element 40 from strands 34 and layers 41 and 42. In manufacturing element 40, one or more of strands 34 and layers 41 and 42 are heated to a temperature that facilitates bonding between the components, depending upon the specific materials utilized for layers 41 and 42. Various radiant heaters or other devices may be utilized to heat the components of element 40. In some manufacturing processes, mold 60 may be heated such that contact between mold 60 and the components of element 40 raises the temperature of the components to a level that facilitates bonding.

Figure 10B:
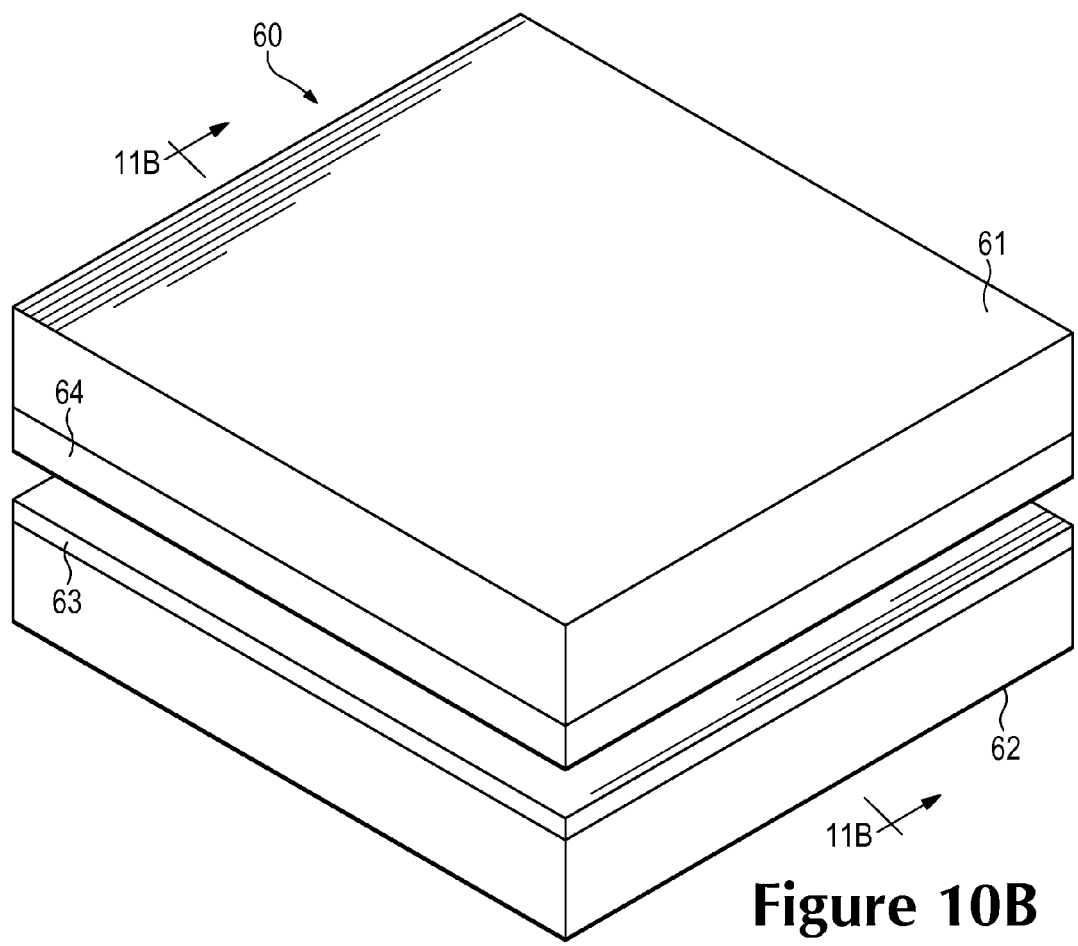
Figure 10C:
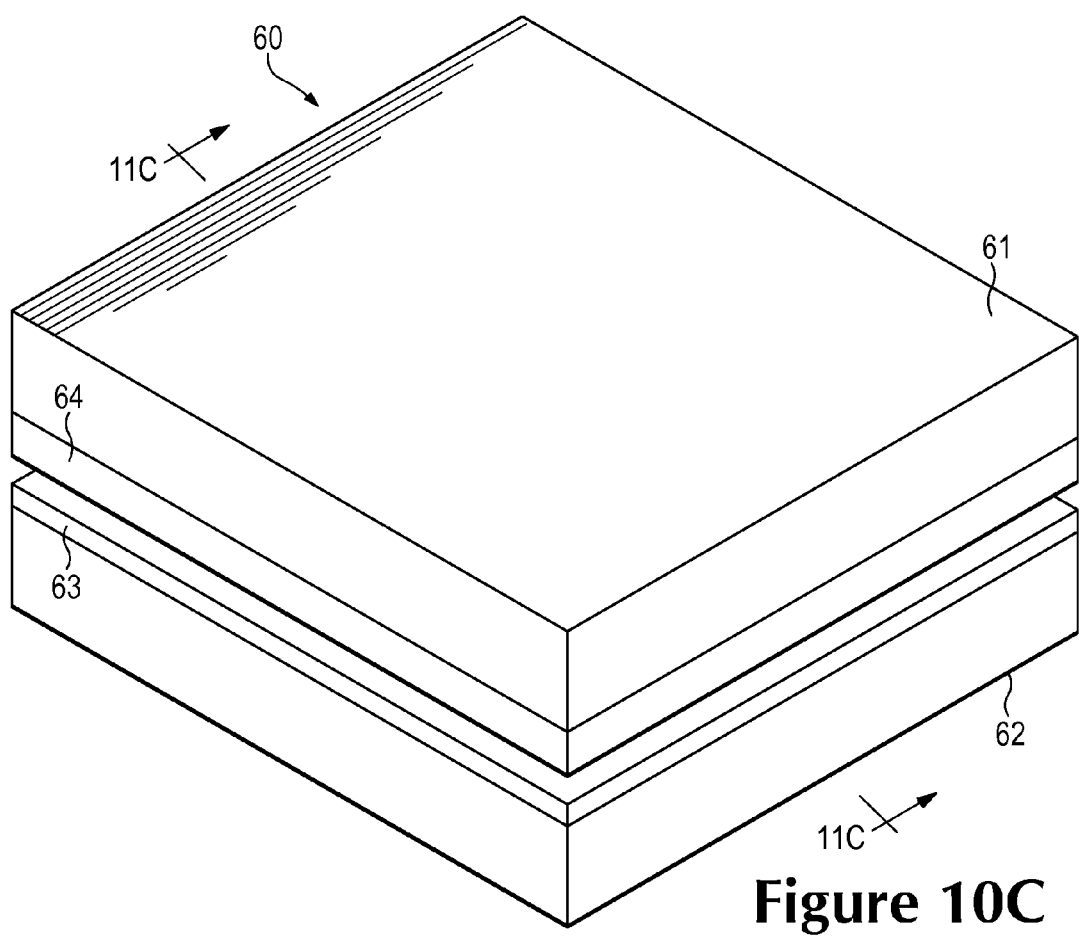
Figure 11B:
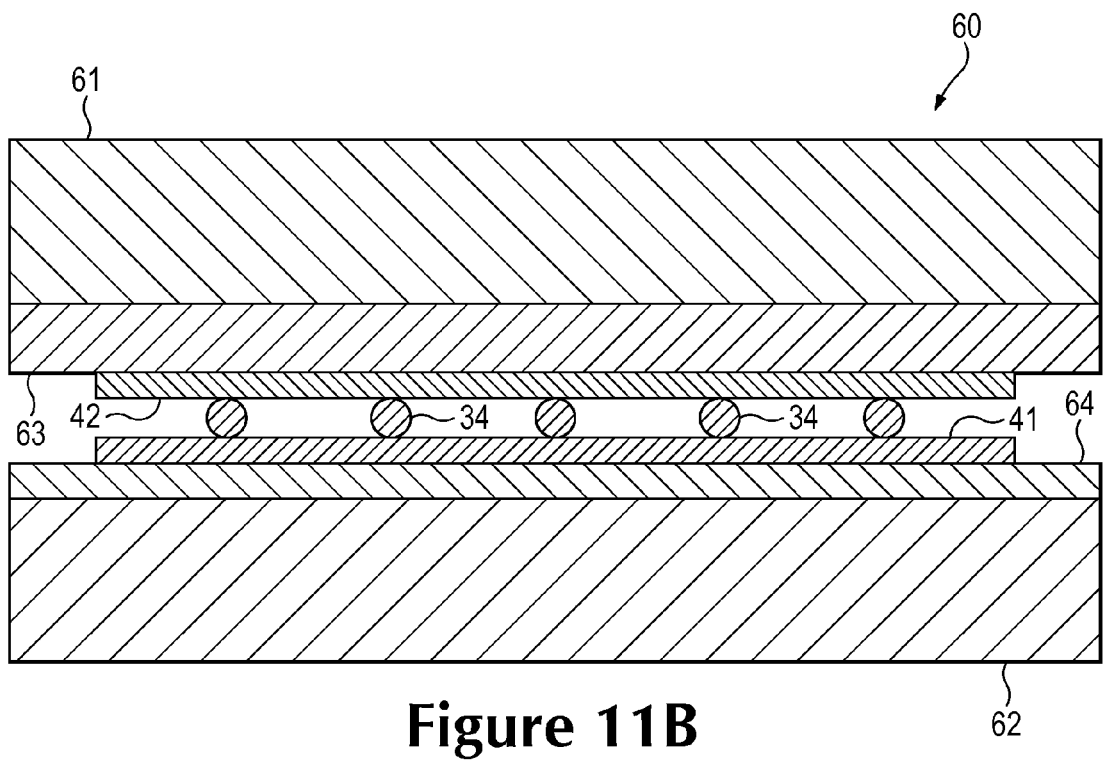
Figure 11C:
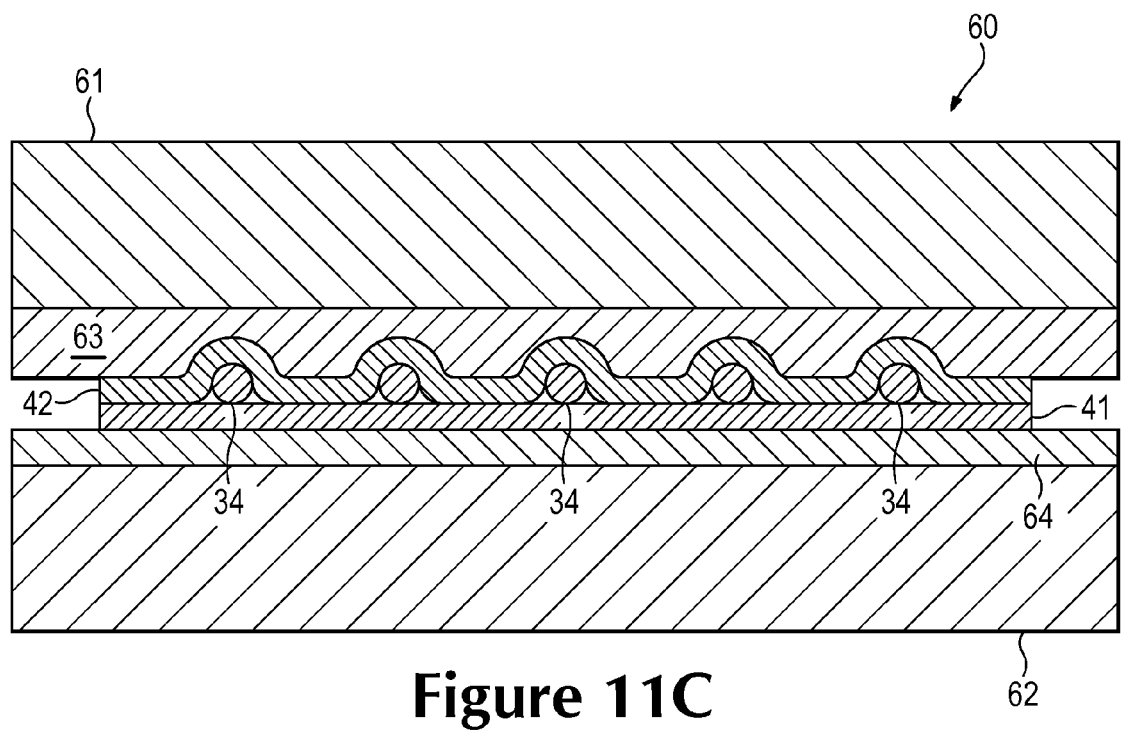

Following heating, the components of element 40 are located between mold portions 61 and 62, as depicted in FIGS. 10A and 11A. In order to properly position the components, a shuttle frame or other device may be utilized. Once positioned, mold portions 61 and 62 translate toward each other and begin to close upon the components such that (a) the surface of first mold portion 61 having material 63 begins to contact cover layer 42 and (b) the surface of second mold portion 62 having material 64 begins to contact base layer 41, as depicted in FIGS. 10B and 11B. Mold portions 61 and 62 then translate further toward each other and compress the components of element 40, as depicted in FIGS. 10C and 11C.

As noted above, material 63 has a lesser hardness, a lesser density, and greater thickness than material 64 and, as a result, material 63 compresses more easily than material 64. Referring to FIGS. 10C and 11C, cover layer 42 protrudes into material 63 in the areas of strands 34, whereas base layer 41 remains substantially planar. Due to the different compressibilities between materials 63 and 64, material 63 compresses in areas where strands 34 are present. At this stage, the depth to which base layer 41 protrudes into material 64 is less than the depth to which cover layer 42 protrudes into material 63. The compressive force of mold 60, coupled with the elevated temperature of the compressed components (a) bonds layers 41 and 42 to each other, (b) may bond strands 34 to either of layers 41 and 42, and (c) molds element 40 such that base layer 41 remains substantially planar and cover layer 42 protrudes outward in the area of strands 34.

Figure 10D:
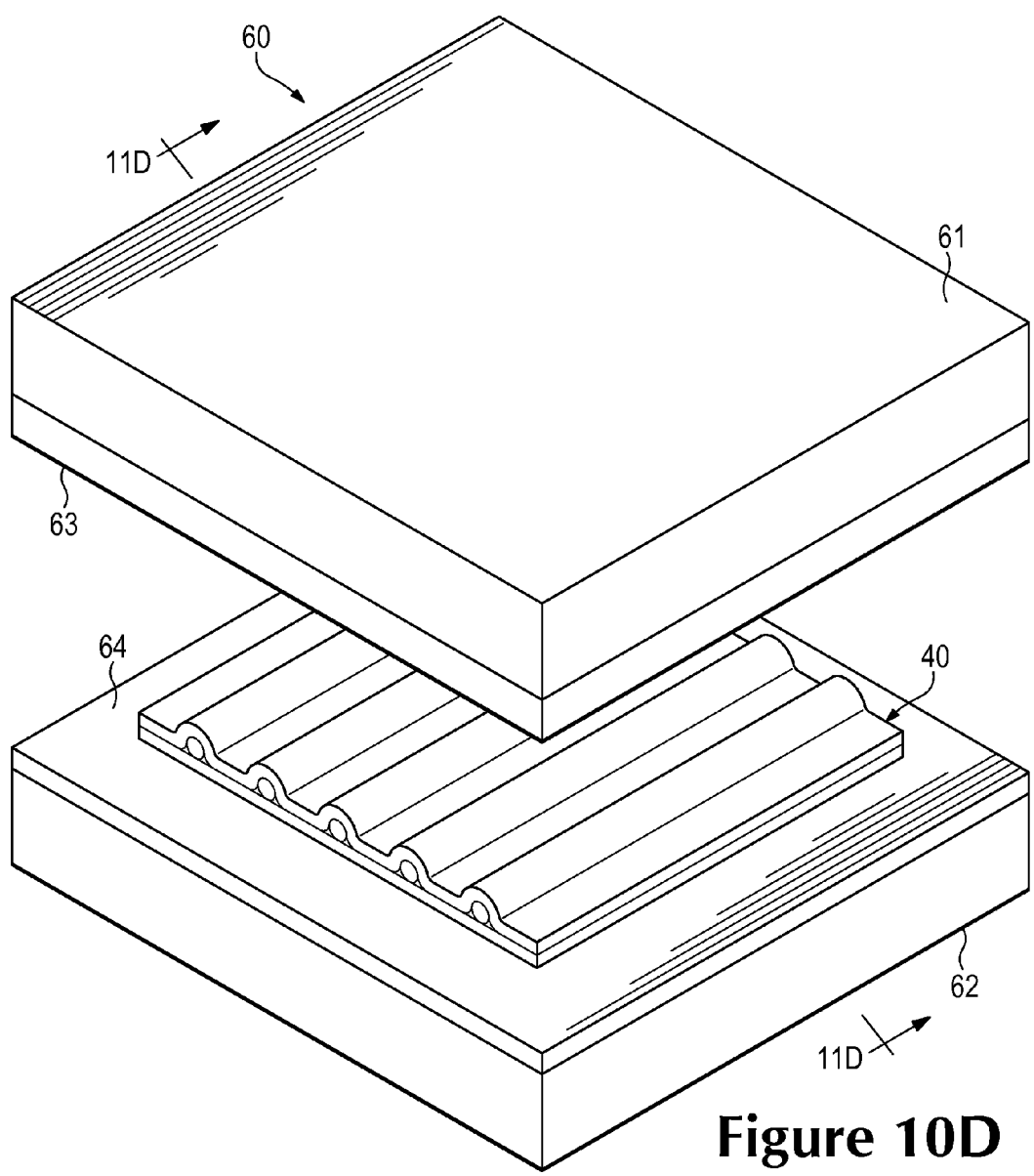
Figure 11D:
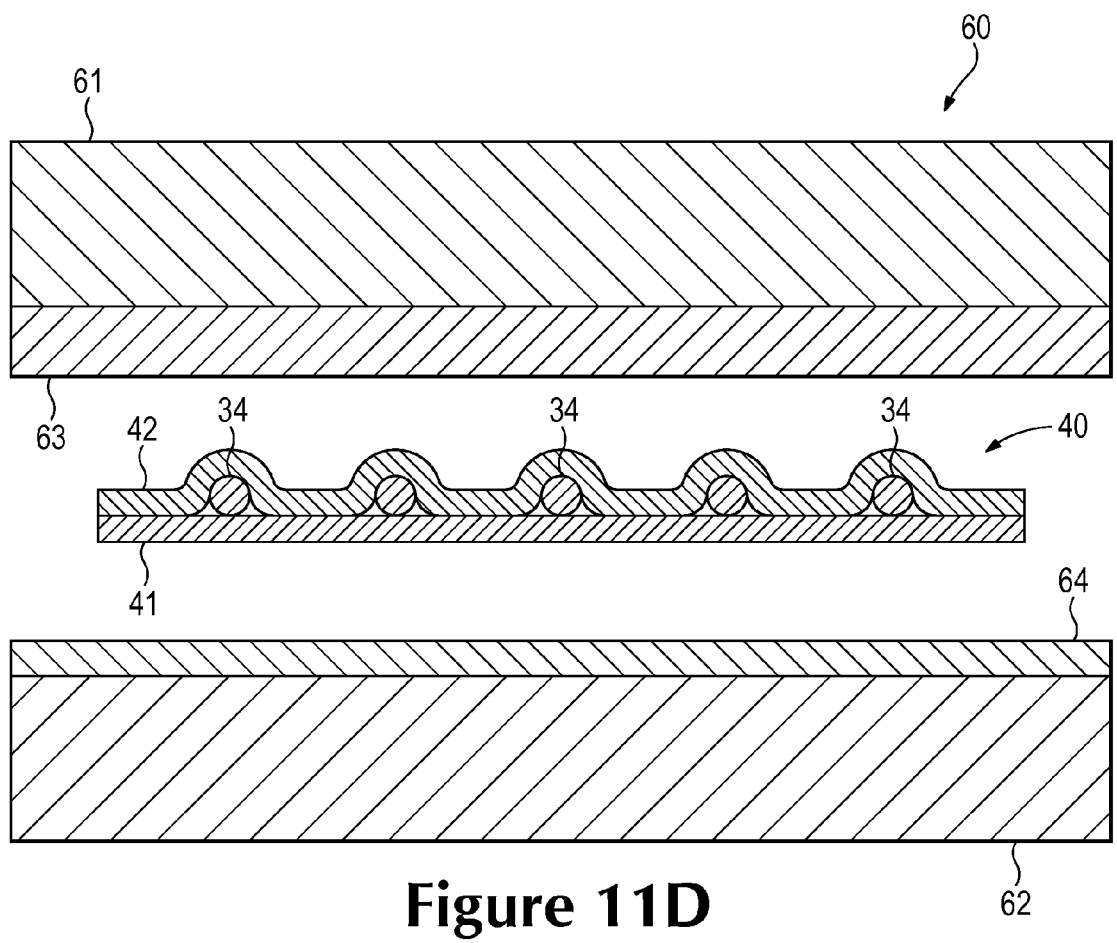

The different compressibilities of materials 63 and 64 (due to differences in hardness, density, and thickness) ensures that cover layer 42 protrudes outward to a greater degree than base layer 41 in the areas of strands 34. In some configurations, the relative compressibilities of materials 63 and 64 may allow base layer 41 to protrude outward to some degree in the areas of strands 34. In general, however, base layer 41 protrudes outward to a lesser degree than cover layer 42, and base layer 41 may not protrude outward at all in some configurations. When bonding and shaping is complete, mold 60 is opened and element 40 is removed and permitted to cool, as depicted in FIGS. 10D and 11D. As a final step in the process, element 40 may be incorporated into upper 30 of footwear 10.

The relative hardnesses, densities, and thicknesses between materials 63 and 64 may vary considerably to provide different compressibilities between the surfaces of mold 60. By varying the hardnesses, densities, and thicknesses, the compressibilities of the surfaces may be tailored to specific molding operations or materials. While hardness, density, and thickness may each be considered, some configurations of mold 60 may have materials 63 and 64 with only different hardnesses, only different densities, or only different thicknesses. Additionally, some configurations of mold 60 may have materials 63 and 64 with (a) different hardnesses and densities, but different thicknesses, (b) different hardnesses and thicknesses, but different densities, or (c) different densities and thicknesses, but different hardnesses. Accordingly, the various properties of material 63 and 64 may be modified in various ways to achieve different relative compressibilities between the surfaces of mold 60.

Figure 12A:
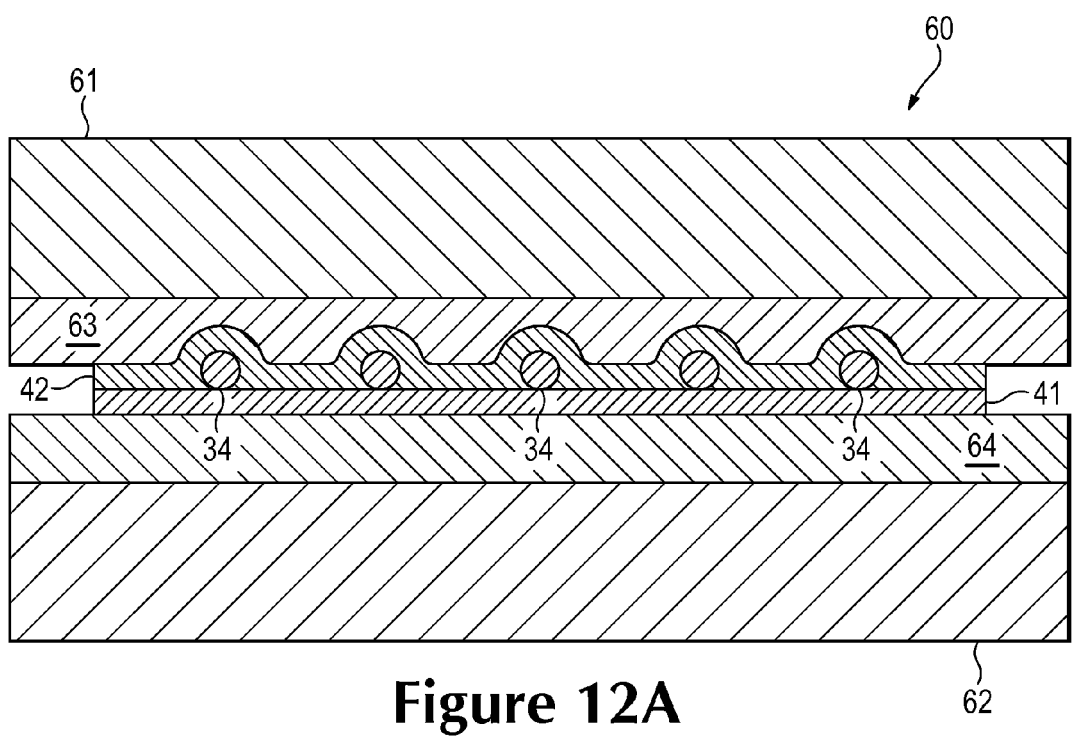
FIGS. 12A-12C are schematic cross-sectional views corresponding with FIG. 11C are depicting further aspects of the molding method.

In the molding process discussed above, cover layer 42 protrudes into material 63 when the components are compressed in mold 60, thereby providing base layer 41 with a relatively flat configuration. As an alternative to this process, the elements may be reversed such that base layer 41 protrudes into material 63 when the components are compressed in mold 60, thereby providing cover layer 42 with a relatively flat configuration. Whereas each of mold portions 61 and 62 may include silicone or other materials having different hardnesses, material 64 may be absent such that the surface of second mold portion 62 is formed from steel, aluminum, or another metal, as depicted in FIG. 12A. In some configurations where material 64 is absent, material 63 may be silicone with a hardness of 30 on the Shore A hardness scale and a thickness of 5 millimeters, for example.

Figure 12B:
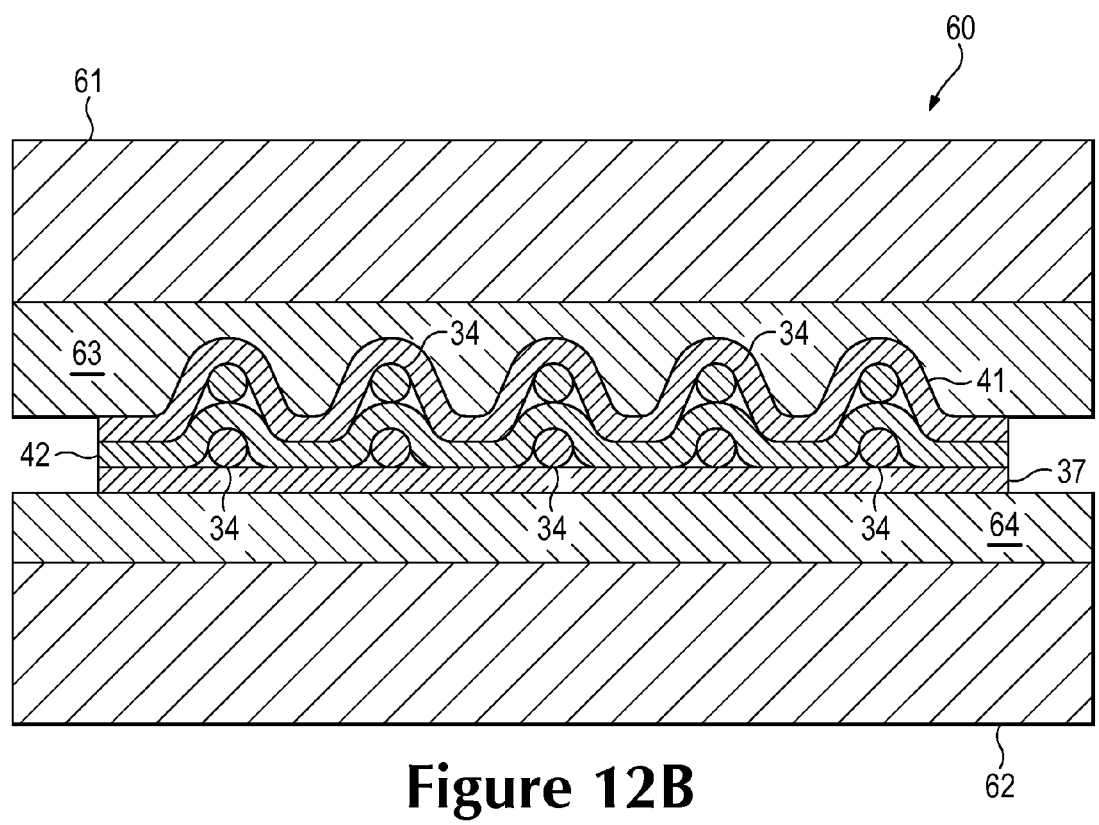
Figure 12C:
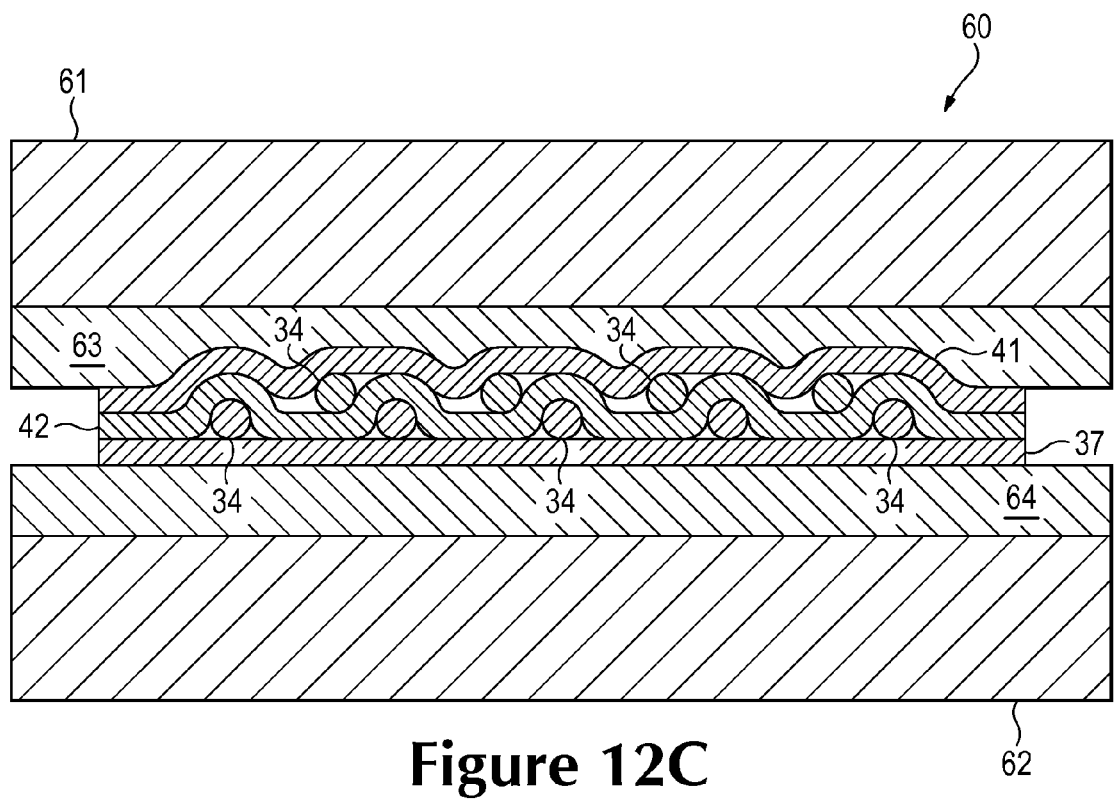

When an embroidery process is utilized to locate strands 34, backing layer 37 may extend over an additional set of strands 34, as depicted in FIG. 9D. A similar molding process may also be utilized for this configuration. Referring to FIG. 12B, both sets of strands 34, backing layer 37, base layer 41, and cover layer 42 are placed within mold 60 and compressed such that strands 34 align and cause cover layer 42 to protrude into material 63. As an alternative, strands 34 may also be offset, as depicted in FIG. 12C.

CONCLUSION

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing an element, the method comprising:
    positioning a strand between a first layer and a second layer;
    locating the strand, the first layer, and the second layer between a first surface and a second surface of a press, the first surface including a first material, and the second surface including a second material, the first material having lesser compressibility than the second material;
    compressing the strand, the first layer, and the second layer between the first surface and the second surface, and heating the strand, the first layer, and the second layer to bond the first layer to the second layer;
    incorporating the strand, the first layer, and the second layer into an article of footwear; and
    wherein the step of incorporating includes positioning the second layer to form a portion of an exterior surface of the article of footwear.

2. The method recited in claim 1, wherein the step of positioning includes locating the strand adjacent and parallel to surfaces of the first layer and the second layer for a distance of at least five centimeters.

3. The method recited in claim 1, wherein the step of positioning includes selecting the first layer to be one of a textile and a polymer sheet.

4. The method recited in claim 1, wherein the step of locating includes selecting each of the first material and the second material to be silicone.

5. The method recited in claim 1, wherein the step of locating includes selecting (a) the first material have a first hardness and (b) the second material to have a second hardness, the first hardness being greater than the second hardness.

6. The method recited in claim 1, wherein the step of locating includes selecting (a) the first material have a first thickness and (b) the second material to have a second thickness, the first thickness being less than the second thickness.

7. The method recited in claim 1, wherein the step of locating includes selecting (a) the first material to have a Shore A hardness greater than 40 and (b) the second material to have a Shore A hardness less than 40.

8. The method recited in claim 1, wherein the step of incorporating includes positioning the first layer to be more toward an interior of the article of footwear than the second layer.

9. A method of manufacturing an element for an article of footwear, the method comprising:
    positioning a strand between a first layer and a second layer;
    locating the strand, the first layer, and the second layer between a first surface and a second surface of a press, each of the first surface and the second surface having substantially planar areas adjacent to the first layer and the second layer, and each of the first surface and the second surface being formed from different materials;
    compressing the strand, the first layer, and the second layer between the first surface and the second surface such that (a) portions of the first layer that are in contact with the strand protrude into the first surface to a first depth and (b) portions of the second layer that are in contact with the strand protrude into the second surface to a second depth, the first depth being less than the second depth;
    incorporating the strand, the first layer, and the second layer into the article of footwear, positioning the first layer to be more toward an interior of the article of footwear than the second layer, and positioning the second layer to form a portion of an exterior surface of the article of footwear.

10. The method recited in claim 9, wherein the step of positioning includes locating the strand adjacent and parallel to surfaces of the first layer and the second layer for a distance of at least five centimeters.

11. The method recited in claim 9, wherein the step of positioning includes selecting the first layer to be one of a textile and a polymer sheet.

12. The method recited in claim 9, wherein the step of positioning includes selecting at least one of the first layer and the second layer to include a thermoplastic polymer material.

13. The method recited in claim 9, wherein the step of locating includes selecting the different materials to have different hardnesses.

14. The method recited in claim 9, wherein the step of locating includes selecting the different materials to have different densities.

15. The method recited in claim 9, wherein the step of locating includes selecting the different materials to have different thicknesses.

16. The method recited in claim 9, wherein the step of compressing includes heating the strand, the first layer, and the second layer to bond the first layer to the second layer.

17. The method recited in claim 9, wherein the first depth is substantially zero.

18. A method of manufacturing an element, the method comprising:
    positioning a strand between a first layer and a second layer;
    locating the strand, the first layer, and the second layer between a first surface and a second surface of a press, the first surface including a first material, and the second surface including a second material, the first material having greater hardness than the second material, and at least one of the first material and the second material being a silicone material;
    compressing the strand, the first layer, and the second layer between the first surface and the second surface such that (a) portions of the first layer that are in contact with the strand are substantially planar and (b) portions of the second layer that are in contact with the strand protrude outward and away from the first layer; and
    further including steps of (a) incorporating the strand, the first layer, and the second layer into an article of footwear and (b) positioning the second layer to form a portion of an exterior surface of the article of footwear.

19. The method recited in claim 18, wherein the step of positioning includes locating the strand adjacent and parallel to surfaces of the first layer and the second layer for a distance of at least five centimeters.

20. The method recited in claim 18, wherein the step of positioning includes selecting the first layer to be one of a textile and a polymer sheet.

21. The method recited in claim 18, wherein the step of positioning includes selecting at least one of the first layer and the second layer to include a thermoplastic polymer material.

22. The method recited in claim 18, wherein the step of locating includes selecting each of the first surface and the second surface to have substantially planar areas adjacent to the first layer and the second layer.

23. The method recited in claim 18, wherein the step of locating includes selecting the first material and the second material to have different thicknesses.

24. The method recited in claim 18, wherein the step of locating includes selecting both of the first material and the second material to be the silicone material, and selecting the first material and the second material to have different thicknesses.

25. The method recited in claim 18, wherein the step of compressing includes heating the strand, the first layer, and the second layer to bond the first layer to the second layer.

26. The method recited in claim 18, further including the step of positioning the first layer to be more toward an interior of the article of footwear than the second layer.

* * * * *